(12) United States Patent
Wang et al.

(10) Patent No.: US 12,302,404 B2
(45) Date of Patent: May 13, 2025

(54) DATA PROCESSING METHOD AND APPARATUS, AND STORAGE MEDIUM

(71) Applicant: HUAWEI TECHNOLOGIES CO., LTD., Guangdong (CN)

(72) Inventors: Xiaolu Wang, Hangzhou (CN); Hejia Luo, Hangzhou (CN); Chenlei Xu, Hangzhou (CN); Jianwei Zhou, Hangzhou (CN); Rong Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 444 days.

(21) Appl. No.: 17/707,299

(22) Filed: Mar. 29, 2022

(65) Prior Publication Data
US 2022/0225424 A1    Jul. 14, 2022

Related U.S. Application Data

(63) Continuation of application No. PCT/CN2020/105753, filed on Jul. 30, 2020.

(30) Foreign Application Priority Data

Sep. 30, 2019  (CN) .......................... 201910940643.7

(51) Int. Cl.
*H04W 74/0833* (2024.01)
*H04L 43/0864* (2022.01)
(Continued)

(52) U.S. Cl.
CPC ..... *H04W 74/0833* (2013.01); *H04L 43/0864* (2013.01); *H04W 74/006* (2013.01); *H04W 74/0866* (2013.01); *H04W 72/23* (2023.01)

(58) Field of Classification Search
CPC ........... H04W 74/0833; H04W 74/006; H04W 74/0866; H04W 72/23; H04L 43/0864
See application file for complete search history.

(56) References Cited

U.S. PATENT DOCUMENTS

| 2019/0169258 A1 | 6/2019 | Antipov et al. |
| 2020/0221402 A1* | 7/2020 | Zhang ............... H04W 72/0453 |

(Continued)

FOREIGN PATENT DOCUMENTS

| CN | 102711273 A | 10/2012 |
| CN | 103346829 A | 10/2013 |

(Continued)

OTHER PUBLICATIONS

Extended European Search Report issued in European Application No. 20872981.4 on Sep. 23, 2022, 11 pages.

(Continued)

*Primary Examiner* — Kwang B Yao
*Assistant Examiner* — Bradley D Lytle, Jr.
(74) *Attorney, Agent, or Firm* — Fish & Richardson P.C.

(57) ABSTRACT

This disclosure provides data processing methods. One example including a network device obtains target information that includes a transmission delay difference corresponding to a target beam or a target cell; determines a first preamble format based on the transmission delay difference, and then determines first configuration information used to indicate the first preamble format and a first set of random access occasions included in a random access period, where an interval between random access times included in the first set of random access occasions is greater than or equal to a preamble length corresponding to the first preamble format; and generates a corresponding first configuration index based on the first configuration information. The preamble formats required for different beams or cells can be deter- (Continued)

mined based on transmission delay differences corresponding to the different beams or cells, and then configuration information of a random access occasion is further determined.

19 Claims, 9 Drawing Sheets

(51) Int. Cl.
  *H04W 74/00* (2009.01)
  *H04W 74/08* (2009.01)
  *H04W 72/23* (2023.01)

(56) References Cited

U.S. PATENT DOCUMENTS

| | | | |
|---|---|---|---|
| 2020/0260480 A1* | 8/2020 | Wu | H04W 74/0833 |
| 2021/0168872 A1* | 6/2021 | Qi | H04J 13/0062 |
| 2022/0183077 A1* | 6/2022 | Lu | H04W 74/0841 |

FOREIGN PATENT DOCUMENTS

| | | |
|---|---|---|
| CN | 105915315 A | 8/2016 |
| CN | 107852266 A | 3/2018 |
| CN | 109451585 A | 3/2019 |
| CN | 109788548 A | 5/2019 |
| CN | 110035488 A | 7/2019 |
| EP | 2425549 A2 | 3/2012 |
| EP | 3425978 A1 | 1/2019 |
| WO | 2018175705 A1 | 9/2018 |
| WO | 2019051373 A1 | 3/2019 |

OTHER PUBLICATIONS

ZTE et al., "Report of Email Discussion [106#70] [NR/NTN] RACH Capacity/Procedures," 3GPP TSG-RAN WG2 Meeting #107, R2-1909256, Prague, Czech Republic, Aug. 26-30, 2019, 38 pages.
3GPP TS 38.211 V15.5.0 (Mar. 2019), "3rd Generation Partnership Project; Technical Specification Group Radio Access Network; NR; Physical channels and modulation (Release 15)," Mar. 2019, 96 pages.
Chang, "Research on LTE RACH process," China Academic Journal Electronic Publishing House, Apr. 2009, 4 pages (with English abstract).
Liu et al., "Research on the Random Access Technology of LTE Based Satellite Mobile Communications," Radio Communications Technology, vol. 43, No. 2, Feb. 2017, 4 pages (with English abstract).
MediaTek Inc., "Improving Random Access in NTN," 3GPP TSG-RAN WG2 Meeting #106, R2-1905704, Reno, USA, May 13-17, 2019, 5 pages.
Office Action issued in Chinese Application No. 201910940643.7 on Sep. 2, 2021, 12 pages (with English translation).
Samsung, "Uplink timing advance/RACH procedure and Initial Access for NTN," 3GPP TSG RAN WG1 Meeting #98, R1-1908488, Prague, CZ, Aug. 26-30, 2019, 8 pages.
ZTE Corporation et al., "Ambiguity on preamble reception in NTN," 3GPP TSG RAN WG2 Meeting #106, R2-1906112, Reno, USA, May 13-17, 2019, 16 pages.

\* cited by examiner

DATA PROCESSING METHOD AND APPARATUS, AND STORAGE MEDIUM

CROSS-REFERENCE TO RELATED APPLICATIONS

This application is a continuation of International Application No. PCT/CN2020/105753, filed on Jul. 30, 2020, which claims priority to Chinese Patent Application No. 201910940643.7, filed on Sep. 30, 2019. The disclosures of the aforementioned applications are hereby incorporated by reference in their entireties.

TECHNICAL FIELD

This application relates to the field of wireless communications technologies, and in particular, to a data processing method and apparatus, and a storage medium.

BACKGROUND

Wireless communication provides unlimited convenience for users, including voice communication, data transmission, and the like. In a design of long term evolution (LTE) and new radio (NR), a manner in which a terminal device (user equipment, UE) accesses a network is a contention-based random access manner.

In the NR standard, to access the network, the terminal device needs to perform cell search and obtain cell system information, to implement downlink synchronization with a network side (a base station/satellite, or the like). Then, the terminal device needs to obtain the cell system information, and establish a connection to a cell by using a random access procedure, to implement uplink synchronization. Specifically, the terminal device may send a random access preamble (preamble) on a resource for a random access occasion (RO) that is configured on the network side, to initiate random access. The preamble includes a cyclic prefix (CP), a Zadoff-chu sequence, and a guard time (GT). The CP is used to compensate for a timing error caused by a round trip delay or a round trip delay difference and multi-path delay spread. Generally, a length of the Zadoff-chu sequence is not less than a length of the CP and a length of the GT is not less than the length of the CP. Therefore, a greater round trip delay between the terminal device and the network side or a greater round trip delay difference indicates a greater required preamble length.

Currently, a 3rd generation partnership project (3GPP) organization is studying adaptation of a 5th generation mobile communications technology (5G) NR standard to a non-terrestrial network (NTN). In NR, a base station and a terminal device served by each beam are basically at the same altitude, and maximum transmission delay differences (max differential delay) between terminal devices served by the beams are the same. Different beams in the same cell are configured by using the same random access occasion.

In a communication scenario of the non-terrestrial network, the network side and the terminal device served by each beam are not at the same altitude and are relatively distant from each other. This is different from an NR terrestrial communication scenario. Therefore, a cell in non-terrestrial communication has a greater diameter, causing a relatively large round trip delay difference of users at different geographical locations in the same cell. For example, a maximum round trip delay difference of a terminal device in a scenario of a geostationary earth orbit (GEO) satellite may reach 1.6 ms. In this scenario, a minimum preamble length is required to be 4.8 ms. For the terminal devices in the same cell in data transmission, a maximum round trip delay difference supported in NR is less than 0.7 ms, and a preamble length is also far less than a requirement in the non-terrestrial communication. Therefore, if a relatively long preamble is still transmitted by using configuration of a random access occasion in NR in the non-terrestrial communication scenario, an interference problem such as preamble detection window overlapping may occur, thereby affecting detection probability of the network side for a preamble. In addition, when different maximum transmission delay differences between terminal devices served by different beams in the same cell exist in the non-terrestrial communication scenario, preamble lengths required in different beams in the same cell are different. Therefore, time domain resources may be wasted if an inflexible configuration manner in which the same random access occasion is used for different beams in the same cell in the terrestrial communication scenario is still used in the non-terrestrial communication scenario. Therefore, how to implement flexible configuration of random access occasions corresponding to different beams in the non-terrestrial scenario to avoid the interference problem such as preamble detection window overlapping due to an excessively large preamble length is an urgent problem to be resolved.

SUMMARY

An embodiment of this application provides a data processing method, to resolve a mutual interference problem such as preamble detection window overlapping in a non-terrestrial communication scenario.

In view of this, a first aspect of this application provides a data processing method, including: A network device obtains target information of a target beam or a target cell. The network device may perform configuration of a random access occasion in a cell at a cell level. The network device may correspond to one or more cells. The target cell may indicate any one of the one or more cells corresponding to the network device. Alternatively, the network device may directly perform configuration of a random access occasion in a beam at a beam level. The network device corresponds to one or more beams. The target beam may indicate any one of the one or more beams corresponding to the network device. The target information includes a transmission delay difference. The target information may further include an orbit height of the network device. The transmission delay difference is a difference between communication round trip delays respectively corresponding to a first location and a second location. The first location is a location corresponding to a reference point in a coverage region of the target beam or the target cell. The second location is a location farthest from the network device in the coverage region of the target beam or the target cell. The transmission delay difference indicates a maximum round trip delay difference corresponding to the target beam or the target cell. The reference point corresponding to the target beam or the target cell may be a point closest to the network device in the coverage region of the target beam or the target cell on the ground; or may be a geometric center of the coverage region of the target beam or the target cell on the ground. The reference point may alternatively be at a location that has a specific height from the ground. For example, the reference point has the same latitude and longitude as the point closest to the network device in the coverage region of the target beam or the target cell on the ground, or the geometric center of the coverage region of the target beam or the target cell on the ground. Herein, a vertical distance between the reference point and the ground is 20 kilometers to 30 kilometers. A communication round trip delay corresponding to the second location is a maximum communication round trip delay in the coverage region of the target beam or the target cell. The network device determines, based on the transmission delay difference in the target information, a first preamble format required for a random access preamble corresponding to the target beam or the target cell. The random access preamble includes a cyclic prefix CP, a Zadoff-chu sequence, and a guard time GT. The random access preamble has a plurality of preamble formats. Random access preambles corresponding to different preamble formats have different lengths of cyclic prefixes CPs, different lengths of Zadoff-chu sequences, and different lengths of guard times GTs. The random access preambles corresponding to the different preamble formats have different preamble lengths. The first preamble format is one of the plurality of preamble formats. The network device determines first configuration information of a random access occasion from one or more types of configuration information based on the first preamble format. The first configuration information is used to indicate the first preamble format and a first set of random access occasions included in a random access period. An interval between random access occasions included in the first set is greater than or equal to a preamble length corresponding to the first preamble format. The random access period indicates a period of random access occasions, for example, may indicate a time period (time interval) of random access occasions that is defined in a standard. The network device generates a corresponding first configuration index based on the first configuration information. The first configuration information is one of the one or more types of configuration information. Therefore, the first configuration index corresponding to the first configuration information may also be one of one or more configuration indexes. A one-to-one correspondence exists between the one or more configuration indexes and the one or more types of configuration information.

It may be learned from the first aspect that, the network device can determine, based on the transmission delay difference corresponding to the target beam or the target cell, the first preamble format required for the random access preamble, and determine, based on the required first preamble format, the first configuration information of the random access occasion corresponding to the target beam or the target cell, so that the interval between random access occasions included in the random access period configured for the target beam or the target cell is greater than or equal to the preamble length corresponding to the first preamble format of the random access preamble required for the target beam or the target cell, to resolve a mutual interference problem such as preamble detection window overlapping in a non-terrestrial communication scenario.

With reference to the first aspect, in a first possible implementation of the first aspect, after the network device generates the corresponding first configuration index based on the first configuration information, the method further includes: The network device sends downlink information to the target beam or the target cell. The downlink information includes the first configuration index. The downlink information is used by a terminal device in a target region or the target cell to determine, based on the first configuration information corresponding to the first configuration index, a random access preamble format and a random access occasion used to transmit a random access preamble.

With reference to the first aspect, in a second possible implementation of the first aspect, the target information further includes a reference multi-path delay corresponding to the target beam or the target cell. The multi-path delay indicates a difference between a minimum time and a maximum time in which signal components arrive at a receive end through different paths. The reference multi-path delay may indicate a maximum multi-path delay in multi-path delays corresponding to different locations in the coverage region of the target beam or the target cell. In an actual application process, the reference multi-path delay may not need to be measured in real time, and may directly use an empirical value of a maximum multi-path delay. For example, a length of a preamble CP is fixed in a terrestrial communication process, and the fixed length of the CP is determined based on a maximum value of a multi-path delay that is of a communication channel in a city and that is obtained through channel measurement. After the network device obtains the target information, the method further includes: The network device determines, based on the reference multi-path delay, a second preamble format required for a random access preamble corresponding to the target beam or the target cell. The network device determines second configuration information of a random access occasion from the one or more types of configuration information based on the second preamble format. The second configuration information is used to indicate the second preamble format and a second set of random access occasions included in a random access period. An interval between random access occasions included in the second set is greater than or equal to a preamble length corresponding to the second preamble format. The network device generates a corresponding second configuration index based on the second configuration information.

It may be learned from the second possible implementation of the first aspect that, the network device respectively determines, based on the transmission delay difference and a reference multi-path signal corresponding to the target beam or the target cell, the first preamble format and the second preamble format required for the random access preambles; and determines, based on the required first preamble format and the required second preamble format, the two types of configuration information of the random access occasions corresponding to the target beam or the target cell. The interval that is between random access occasions and that is indicated by each of the two types of configuration information is greater than or equal to the preamble length corresponding to the corresponding preamble format. The two types of configuration information are separately used by a terminal device with a positioning function and a terminal device without the positioning function in the target beam or the target cell to determine the random access preamble format and the random access occasion used to transmit the random access preamble. In this way, a mutual interference problem such as preamble detection window overlapping in a non-terrestrial communication scenario can be avoided. In addition, configuration of a random access occasion can be implemented for different terminal devices, to save time-frequency resources occupied by the random access preamble.

With reference to the second possible implementation of the first aspect, in a third possible implementation of the first aspect, after the network device generates the corresponding second configuration index based on the second configuration information, the method further includes: The network device sends downlink information to the target beam or the target cell. The downlink information includes the first configuration index and the second configuration index. The downlink information is used to: after a terminal device in a target region determines that the terminal device does not have the positioning function, determine, based on the first configuration information corresponding to the first configuration index, a random access preamble format and a random access occasion used to transmit a random access preamble; or when a terminal device determines that the terminal device has the positioning function, determine, based on the second configuration information corresponding to the second configuration index, a random access preamble format and a random access occasion used to transmit a random access preamble.

It may be learned from the third possible implementation of the first aspect that the terminal device corresponding to the target beam or the target cell can select corresponding configuration of a random access occasion based on whether the terminal device has the positioning function, to save time-frequency resources occupied by the random access preamble. In addition, configuration manners of a random access occasion are diversified.

With reference to any one of the first aspect, or the first to the third possible implementations of the first aspect, in a fourth possible implementation of the first aspect, the configuration information includes a target parameter set and a start slot number of a random access occasion, and the target parameter set includes a random access preamble format.

It may be learned from the fourth possible implementation of the first aspect that, in a manner of increasing the start slot number of the random access occasion, a quantity of random access occasions is increased, a waste of time domain resources is avoided, and a capacity of the random access preamble is improved.

With reference to the fourth possible implementation of the first aspect, in a fifth possible implementation of the first aspect, the target parameter set further includes one or more of the following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

With reference to any one of the second to the fifth possible implementations of the first aspect, in a sixth possible implementation of the first aspect, the first configuration index or the second configuration index is a physical random access channel PRACH configuration index, the PRACH configuration index includes n bits, a size of the configuration index may correspond to one or more types of configuration information, a quantity of the plurality of types of configuration information may be less than or equal to $2^n$, and the size of the configuration index may be n bits. Herein, m bits in the n bits are used to indicate the start slot number of the random access occasion, a value of m may correspond to a quantity of start slot numbers, n is greater than m, and m is an integer greater than or equal to 1.

With reference to any one of the second to the fifth possible implementations of the first aspect, in a seventh possible implementation of the first aspect, the first configuration index or the second configuration index includes a first index and a second index, the first index is used to indicate a target parameter set, and the second index is used to indicate a start slot number of the random access occasion. The network device may indicate the second index by using four bits indicating a high-layer parameter of cyclic shift signaling. In this embodiment of this application, the network device may also indicate the second index by adding bits to high-layer signaling (for example, a SIB 1), and send the signaling.

A second aspect of this application provides a data processing method, including: A terminal device receives downlink information sent by a network device. The downlink information includes a first configuration index. First configuration information corresponding to the first configuration index is determined by the network device from one or more types of configuration information based on a first preamble format required for a random access preamble corresponding to a target beam or a target cell. The network device may perform configuration of a random access occasion in a cell at a cell level. The network device may correspond to one or more cells. The target cell may indicate any one of the one or more cells corresponding to the network device. Alternatively, the network device may directly perform configuration of a random access occasion in a beam at a beam level. The network device corresponds to one or more beams. The target beam may indicate any one of the one or more beams corresponding to the network device. The first configuration information is used to indicate the first preamble format and a first set of random access occasions included in a random access period. An interval between random access occasions included in the first set is greater than or equal to a preamble length corresponding to the first preamble format. The first preamble format is determined by the network device based on a transmission delay difference included in obtained target information. The target information may further include an orbit height of the network device. The transmission delay difference is a difference between communication round trip delays respectively corresponding to a first location and a second location. The transmission delay difference indicates a maximum round trip delay difference corresponding to the target beam or the target cell. The first location is a location corresponding to a reference point in a coverage region of the target beam. The reference point (reference point) corresponding to the target beam or the target cell may be a point closest to the network device in the coverage region of the target beam or the target cell on the ground; or may be a geometric center of the coverage region of the target beam or the target cell on the ground. The reference point may alternatively be at a location that has a specific height from the ground. For example, the reference point has the same latitude and longitude as the point closest to the network device in the coverage region of the target beam or the target cell on the ground, or the geometric center of the coverage region of the target beam or the target cell on the ground. Herein, a vertical distance between the reference point and the ground is 20 kilometers to 30 kilometers. The second location is a location farthest from the network device in the coverage region of the target beam. A communication round trip delay corresponding to the second location is a maximum communication round trip delay in the coverage region of the target beam or the target cell. The terminal device determines, based on the downlink information, a random access preamble format and a random access occasion used to transmit a random access preamble.

It may be learned from the second aspect that, the network device can determine, based on the transmission delay difference corresponding to the target beam or the target cell, the first preamble format required for the random access preamble, and determine, based on the required first preamble format, the first configuration information of the random access occasion corresponding to the target beam or the target cell, so that the interval between random access occasions included in the random access period configured for the target beam or the target cell is greater than or equal to the preamble length corresponding to the first preamble format of the random access preamble required for the target beam or the target cell, to resolve a mutual interference problem such as preamble detection window overlapping in a non-terrestrial communication scenario.

With reference to the second aspect, in a first possible implementation of the second aspect, that the terminal device determines, based on the downlink information, the random access preamble format and the random access occasion used to transmit the random access preamble includes: The terminal device determines the first configuration information based on the first configuration index in the downlink information. The terminal device determines, based on the first configuration information, the random access preamble format and the random access occasion used to transmit the random access preamble.

With reference to the second aspect, in a second possible implementation of the second aspect, the downlink information further includes a second configuration index. Second configuration information corresponding to the second configuration index is determined by the network device from the one or more types of configuration information based on a second preamble format required for a random access preamble corresponding to the target beam or the target cell. The second configuration information is used to indicate the second preamble format and a second set of random access occasions included in a random access period. An interval between random access occasions included in the second set is greater than or equal to a preamble length corresponding to the second preamble format. The second preamble format is determined by the network device based on a reference multi-path delay included in the obtained target information. The multi-path delay indicates a difference between a minimum time and a maximum time in which signal components arrive at a receive end through different paths. The reference multi-path delay may indicate a maximum multi-path delay in multi-path delays corresponding to different locations in the coverage region of the target beam or the target cell. In an actual application process, the reference multi-path delay may not need to be measured in real time, and may directly use an empirical value of a maximum multi-path delay. For example, a length of a preamble CP is fixed in a terrestrial communication process, and the fixed length of the CP is determined based on a maximum value of a multi-path delay that is of a communication channel in a city and that is obtained through channel measurement. That the terminal device determines, based on the downlink information, the random access preamble format and the random access occasion used to transmit the random access preamble includes: The terminal device determines whether the terminal device has a positioning function. If the terminal device does not have the positioning function, the terminal device determines the first configuration information based on the first configuration index, and the terminal device determines, based on the first configuration information, the random access preamble format and the random access occasion used to transmit the random access preamble. If the terminal device has the positioning function, the terminal device determines the second configuration information based on the second configuration index, and the terminal device determines, based on the second configuration information, the random access preamble format and the random access occasion used to transmit the random access preamble.

With reference to any one of the second aspect, or the first and the second possible implementations of the second aspect, in a third possible implementation of the second aspect, the configuration information includes a target parameter set and a start slot number of a random access occasion, and the target parameter set includes a random access preamble format.

With reference to the third possible implementation of the second aspect, in a fourth possible implementation of the second aspect, the target parameter set further includes one or more of the following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

With reference to any one of the second aspect, or the first to the fourth possible implementations of the second aspect, in a fifth possible implementation of the second aspect, the first configuration index or the second configuration index is a physical random access channel PRACH configuration index, the PRACH configuration index includes n bits, m bits in the n bits are used to indicate the start slot number of the random access occasion, n is greater than m, and m is an integer greater than or equal to 1.

With reference to any one of the second aspect, or the first to the fourth possible implementations of the second aspect, in a sixth possible implementation of the second aspect, the first configuration index or the second configuration index includes a first index and a second index, the first index is used to indicate a target parameter set, and the second index is used to indicate a start slot number of the random access occasion.

A third aspect of this application provides a data processing apparatus, including an obtaining module, a determining module, and a generation module. The obtaining module is configured to obtain target information of a target beam or a target cell. The target information includes a transmission delay difference. The transmission delay difference is a difference between communication round trip delays respectively corresponding to a first location and a second location. The first location is a location corresponding to a reference point in a coverage region of the target beam or the target cell. The second location is a location farthest from the network device in the coverage region of the target beam or the target cell. The determining module is configured to determine, based on the transmission delay difference included in the target information obtained by the obtaining module, a first preamble format required for a random access preamble corresponding to the target beam or the target cell. The determining module is further configured to determine first configuration information of a random access occasion from one or more types of configuration information based on the first preamble format. The first configuration information is used to indicate the first preamble format and a first set of random access occasions included in a random access period. An interval between random access occasions included in the first set is greater than or equal to a preamble length corresponding to the first preamble format. The generation module is configured to generate a corresponding first configuration index based on the first configuration information determined by the determining module.

With reference to the third aspect, in a first possible implementation of the third aspect, the apparatus further includes a sending module, configured to send downlink information to the target beam or the target cell. The downlink information includes the first configuration index generated by the generation module. The downlink information is used by a terminal device in a target region or the target cell to determine, based on the first configuration information corresponding to the first configuration index, a random access preamble format and a random access occasion used to transmit a random access preamble.

With reference to the third aspect, in a second possible implementation of the third aspect, the target information further includes a reference multi-path delay corresponding to the target beam or the target cell. The determining module is further configured to: determine, based on the reference multi-path delay in the target information obtained by the obtaining module, a second preamble format required for a random access preamble corresponding to the target beam or the target cell; and determine second configuration information of a random access occasion from the one or more types of configuration information based on the second preamble format, where the second configuration information is used to indicate the second preamble format and a second set of random access occasions included in a random access period, and an interval between random access occasions included in the second set is greater than or equal to a preamble length corresponding to the second preamble format. The generation module is further configured to generate a corresponding second configuration index based on the second configuration information determined by the determining module.

With reference to the second possible implementation of the third aspect, in a third possible implementation of the third aspect, the sending module is further configured to send downlink information to the target beam or the target cell. The downlink information includes the first configuration index and the second configuration index that are determined by the determining module. The downlink information is used to: after a terminal device in a target region determines that the terminal device does not have a positioning function, determine, based on the first configuration information corresponding to the first configuration index, a random access preamble format and a random access occasion used to transmit a random access preamble; or when a terminal device determines that the terminal device has a positioning function, determine, based on the second configuration information corresponding to the second configuration index, a random access preamble format and a random access occasion used to transmit a random access preamble.

With reference to any one of the third aspect, or the first to the third possible implementations of the third aspect, in a fourth possible implementation of the third aspect, the configuration information includes a target parameter set and a start slot number of a random access occasion, and the target parameter set includes a random access preamble format.

With reference to the fourth possible implementation of the third aspect, in a fifth possible implementation of the third aspect, the target parameter set further includes one or more of the following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

With reference to any one of the second to the fifth possible implementations of the third aspect, in a sixth possible implementation of the third aspect, the first configuration index or the second configuration index is a physical random access channel PRACH configuration index, the PRACH configuration index includes n bits, m bits in the n bits are used to indicate the start slot number of the random access occasion, n is greater than m, and m is an integer greater than or equal to 1.

With reference to any one of the second to the fifth possible implementations of the third aspect, in a seventh possible implementation of the third aspect, the first configuration index or the second configuration index includes a first index and a second index, the first index is used to indicate a target parameter set, and the second index is used to indicate a start slot number of the random access occasion.

A fourth aspect of this application provides a data processing apparatus, including a receiving module and a determining module. The receiving module is configured to receive downlink information sent by a network device. The downlink information includes a first configuration index. First configuration information corresponding to the first configuration index is determined by the network device from one or more types of configuration information based on a first preamble format required for a random access preamble corresponding to a target beam or a target cell. The first configuration information is used to indicate the first preamble format and a first set of random access occasions included in a random access period. An interval between random access occasions included in the first set is greater than or equal to a preamble length corresponding to the first preamble format. The first preamble format is determined by the network device based on a transmission delay difference included in obtained target information. The transmission delay difference is a difference between communication round trip delays respectively corresponding to a first location and a second location. The first location is a location corresponding to a reference point in a coverage region of the target beam. The second location is a location farthest from the network device in the coverage region of the target beam. The determining module is configured to determine, based on the downlink information received by the receiving module, a random access preamble format and a random access occasion used to transmit a random access preamble.

With reference to the fourth aspect, in a first possible implementation of the fourth aspect, the determining module is configured to: determine the first configuration information based on the first configuration index in the downlink information; and determine, based on the first configuration information, the random access preamble format and the random access occasion used to transmit the random access preamble.

With reference to the fourth aspect, in a second possible implementation of the fourth aspect, the downlink information further includes a second configuration index. Second configuration information corresponding to the second configuration index is determined by the network device from the one or more types of configuration information based on a second preamble format required for a random access preamble corresponding to the target beam or the target cell. The second configuration information is used to indicate the second preamble format and a second set of random access occasions included in a random access period. An interval between random access occasions included in the second set is greater than or equal to a preamble length corresponding to the second preamble format. The determining module is configured to: determine whether the apparatus has a positioning function; and if the apparatus does not have the positioning function, determine the first configuration information based on the first configuration index, and determine, based on the first configuration information, the random access preamble format and the random access occasion used to transmit the random access preamble; or if the apparatus has the positioning function, determine the second configuration information based on the second configuration index, and determine, based on the second configuration information, the random access preamble format and the random access occasion used to transmit the random access preamble.

With reference to any one of the fourth aspect, or the first and the second possible implementations of the fourth aspect, in a third possible implementation of the fourth aspect, the configuration information includes a target parameter set and a start slot number of a random access occasion, and the target parameter set includes a random access preamble format.

With reference to the third possible implementation of the fourth aspect, in a fourth possible implementation of the fourth aspect, the target parameter set further includes one or more of the following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

With reference to any one of the fourth aspect, or the first to the fourth possible implementations of the fourth aspect, in a fifth possible implementation of the fourth aspect, the first configuration index or the second configuration index is a physical random access channel PRACH configuration index, the PRACH configuration index includes n bits, m bits in the n bits are used to indicate the start slot number of the random access occasion, n is greater than m, and m is an integer greater than or equal to 1.

With reference to any one of the fourth aspect, or the first to the fourth possible implementations of the fourth aspect, in a sixth possible implementation of the fourth aspect, the first configuration index or the second configuration index includes a first index and a second index, the first index is used to indicate a target parameter set, and the second index is used to indicate a start slot number of the random access occasion.

A fifth aspect of this application provides a network device. The network device includes a processor and a memory. The memory is configured to store computer-readable instructions (or referred to as a computer program), and the processor is configured to read the computer-readable instructions to implement the method provided in any one of the foregoing aspect related to the network device and the implementations thereof.

In some implementations, the network device further includes a transceiver, configured to receive and send data.

A sixth aspect of this application provides a terminal device. The terminal device includes a processor and a memory. The memory is configured to store computer-readable instructions (or referred to as a computer program), and the processor is configured to read the computer-readable instructions to implement the method provided in any one of the foregoing aspect related to the terminal device and the implementations thereof.

In some implementations, the terminal device further includes a transceiver, configured to receive and send data.

A seventh aspect of this application provides a computer storage medium. The computer storage medium may be non-volatile. The computer storage medium stores computer-readable instructions. When the computer-readable instructions are executed by a processor, the method in the first aspect or any possible implementation of the first aspect is performed.

An eighth aspect of this application provides a computer storage medium. The computer storage medium may be non-volatile. The computer storage medium stores computer-readable instructions. When the computer-readable instructions are executed by a processor, the method in the second aspect or any possible implementation of the second aspect is performed.

In the data processing method used in the embodiments of the present invention, the network device can determine, based on the transmission delay difference corresponding to the target beam or the target cell, the first preamble format required for the random access preamble, and determine, based on the required first preamble format, the first configuration information of the random access occasion corresponding to the target beam or the target cell, so that the interval between random access occasions included in the random access period configured for the target beam or the target cell is greater than or equal to the preamble length corresponding to the first preamble format of the random access preamble required for the target beam or the target cell, to resolve a mutual interference problem such as preamble detection window overlapping in a non-terrestrial communication scenario.

DESCRIPTION OF EMBODIMENTS

Figure 1:
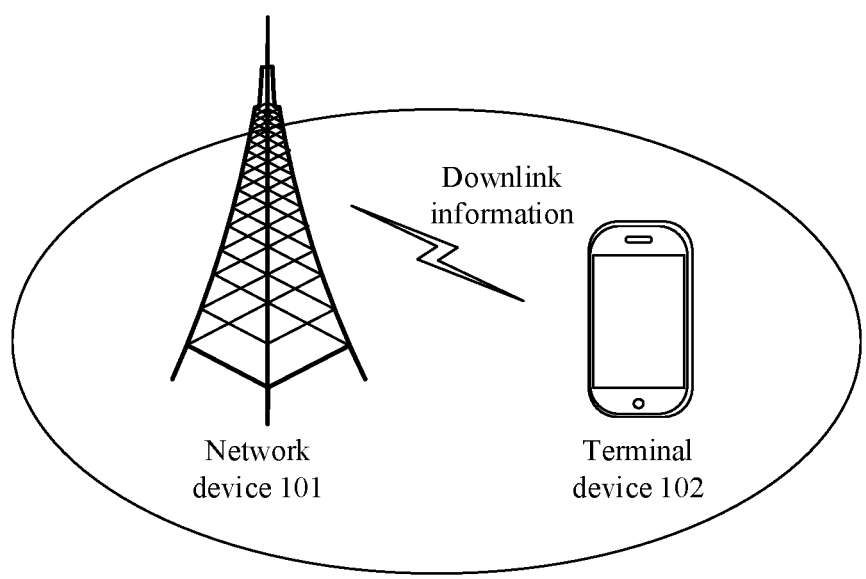
FIG. 1 is a schematic diagram of an architecture of a communications system according to an embodiment of this application.

To make objectives, technical solutions, and advantages of the present invention clearer, the following describes embodiments of this application with reference to the accompanying drawings. It is clear that the described embodiments are merely some rather than all of the embodiments of the present invention. A person of ordinary skill in the art may learn that, as a new application scenario emerges, the technical solutions provided in the embodiments of the present invention are also applicable to a similar technical problem.

In this specification, the claims, and the accompanying drawings of this application, the terms "first", "second", and on the like are intended to distinguish between similar objects but do not necessarily indicate a specific order or sequence. It should be understood that the data used in such a way are interchangeable in proper circumstances, so that the embodiments described herein can be implemented in other orders than the order illustrated or described herein. In addition, the terms "include" and "have" and any variations thereof are intended to cover non-exclusive inclusions. For example, a process, method, system, product, or device that includes a list of steps or modules is not necessarily limited to those steps or modules, but may include other steps or modules not expressly listed or inherent to such a process, method, system, product, or device. Naming or numbering of steps in this application does not mean that steps in the method procedure need to be performed according to a time/logical order indicated by the naming or numbering. An execution order of process steps that have been named or numbered may be changed according to a technical objective to be implemented, provided that a same or similar technical effect can be achieved. Division into the modules in this application is logical division, and may be other division in actual implementation. For example, a plurality of modules may be combined or integrated into another system, or some features may be ignored or may not be performed. In addition, the displayed or discussed mutual couplings or direct couplings or communication connections may be implemented by using some interfaces. The indirect couplings or communication connections between the modules may be implemented in electronic or other similar forms. This is not limited in this application. In addition, modules or submodules described as separate components may be or may not be physically separated, or may be or may not be physical modules, or may be distributed on a plurality of circuit modules. Objectives of the solutions of this application may be achieved by selecting some or all of the modules based on actual demands.

In an existing protocol, a network side delivers a physical random access signal configuration index (PRACH-configuration index) to UE by using a system information block type 1 (SIB1). The UE queries a random access occasion configuration table to determine a preamble format that needs to be used and a random access occasion for sending a preamble, and then sends the preamble at the random access occasion to initiate random access to the network side. In the existing protocol, the random access occasion is configured based on a period in time domain. A frame period of the random access occasions is configured as 10 ms, 20 ms, 40 ms, 80 ms, and 160 ms. The random access occasion configuration table further shows configuration parameters, for example, a frame number of a system frame in which a random access occasion is located, a subframe number of a random access occasion, a start symbol of a random access occasion, a quantity of slots included in a subframe in which a random access occasion is located, and a quantity of random access occasions included in a slot in which a random access occasion is located. In the existing protocol, because a random access preamble has a relatively short length, the random access preamble can be generally sent in one slot. Therefore, a slot interval does not exist between configured random access occasions. This is only applicable to a terrestrial communication scenario in which a cell radius is less than 100 km. For a larger cell in a non-terrestrial communication scenario, a round trip delay difference is greater in the cell, and a preamble length that needs to be sent is generally greater than one slot. Therefore, a random access occasion configuration manner in the existing protocol is not applicable to the non-terrestrial communication scenario. In addition, maximum round trip delay differences corresponding to different beams are the same in the same cell in NR. Therefore, the same random access occasion configuration is used for different beams in the same cell. However, in the non-terrestrial communication scenario, maximum round trip delay differences corresponding to different beams are different in the same cell. Therefore, required preamble lengths are also different. In this case, using the same random access occasion configuration is apparently not flexible.

Due to the foregoing reasons, the embodiments of this application provide a data processing method. A network device can determine, based on a transmission delay difference corresponding to a target beam or a target cell, a first preamble format required for a random access preamble, and determine, based on the required first preamble format, first configuration information of the random access occasion corresponding to the target beam or the target cell, so that an interval between random access occasions included in a random access period configured for the target beam or the target cell is greater than or equal to a preamble length corresponding to the first preamble format of the random access preamble required for the target beam or the target cell, to resolve a mutual interference problem such as preamble detection window overlapping in the non-terrestrial communication scenario. The embodiments of this application further provide a corresponding data processing apparatus. Details are described in the following.

FIG. 1 is a schematic diagram of an architecture of a communications system according to an embodiment of this application.

With reference to FIG. 1, the communications system provided in this embodiment of this application includes a network device 101 and a terminal device 102. When the communications system includes a core network, the network device 101 may further be connected to the core network. The network device 101 may further communicate with an internet protocol (internet protocol, IP) network, for example, an internet (internet), a private IP network, or another data network. The network device 101 provides a service for a terminal device within a coverage region of the network device 101. Refer to FIG. 1. For example, the network device 101 provides wireless access for one or more terminal devices 102 within the coverage region of the network device 101.

The network device 101 may be a device configured to communicate with the terminal device 102. For example, the network device 101 may be a base transceiver station (BTS) in a GSM system or an SDMA system, or may be a NodeB (NB) in a WCDMA system, or may be an evolved NodeB (evolved NodeB, eNB, or eNodeB) in an LTE system, or a network device in a 5G network, for example, a satellite base station in a satellite communication system. The satellite base station may be a geostationary earth orbit (GEO) satellite, or may be a non-geostationary earth orbit (NGEO) such as a medium earth orbit (MEO) satellite or a low earth orbit (LEO) satellite, or may be a high altitude platform station (HAPS), or the like.

Downlink synchronization is implemented between the terminal device 102 in this application and the network device 101 through cell search. In this application, the terminal device 102 may be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device 102 may access a satellite network through an air interface and initiate a service such as a call or going online on the Internet, and may be a mobile device that supports a 5G new radio (NR, new radio). Typically, the terminal device 102 may be a mobile phone, a tablet computer, a portable notebook computer, a virtual/a mixed/ an augmented reality device, a navigation device, a ground base station (for example, an eNB or a gNB), a ground station (GS), a session initiation protocol (SIP) phone, a wireless local loop (WLL) station, a personal digital assistant (PDA), a handheld device with a communication function, a computing device, another processing device connected to a wireless modem, a vehicle-mounted device, a wearable device, a terminal device in a 5G network, a terminal device in a future evolved public land mobile network (PLMN) or another future communications system, or the like.

Figure 2:
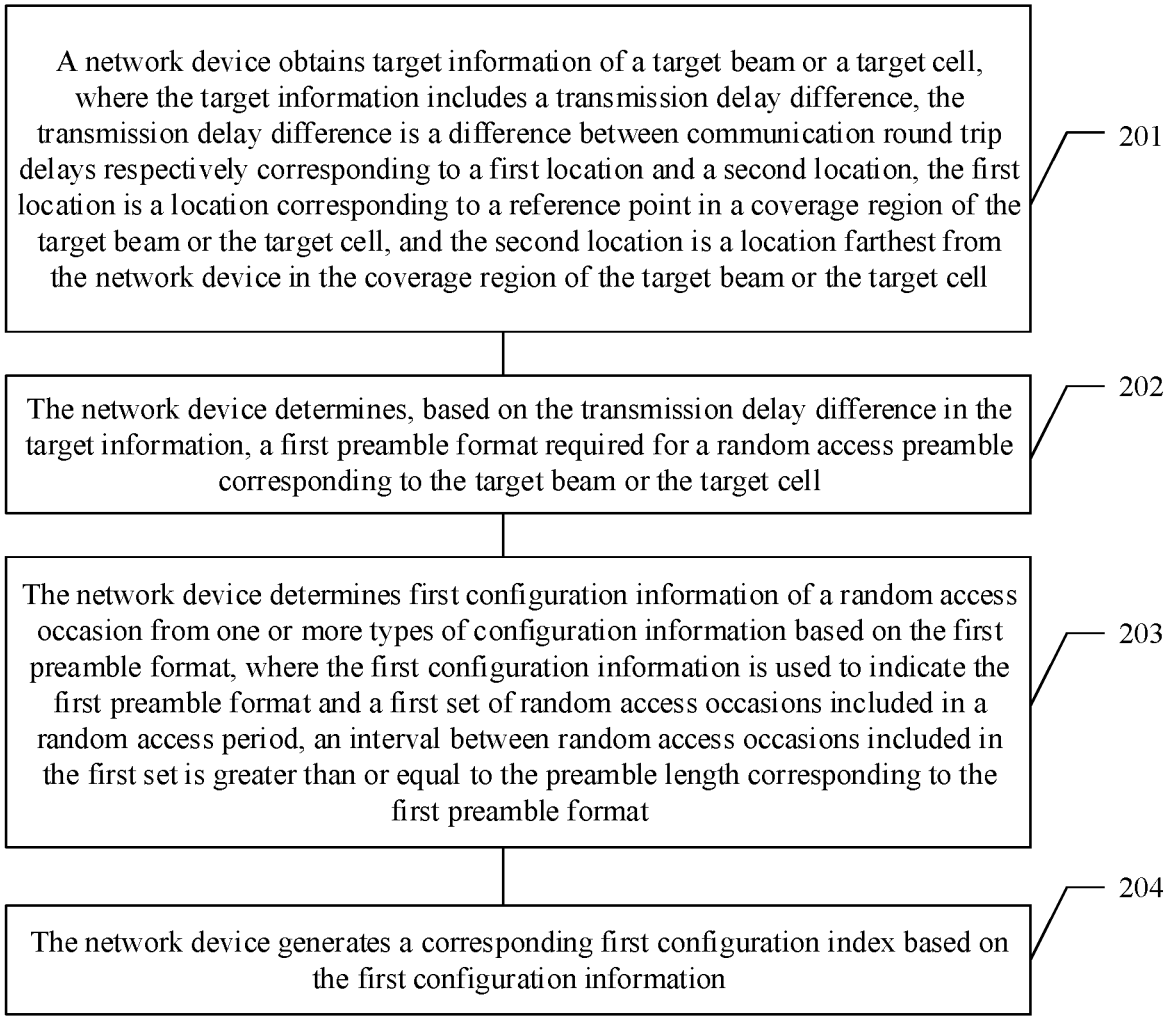
FIG. 2 is a schematic diagram of an embodiment of a data processing method according to an embodiment of this application.

FIG. 2 is a schematic diagram of an embodiment of a data processing method according to an embodiment of this application.

With reference to FIG. 2, the embodiment of the data processing method provided in the embodiments of this application may include the following steps:

201. A network device obtains target information of a target beam or a target cell. The target information includes a transmission delay difference. The transmission delay difference is a difference between communication round trip delays respectively corresponding to a first location and a second location. The first location is a location corresponding to a reference point in a coverage region of the target beam or the target cell. The second location is a location farthest from the network device in the coverage region of the target beam or the target cell.

In this embodiment of this application, the network device may perform configuration of a random access occasion in a cell at a cell level. The network device may correspond to one or more cells. The target cell in this embodiment of this application may indicate any one of the one or more cells corresponding to the network device. One cell may correspond to one or more beams. When the network device performs the configuration of the random access occasion in the cell at the cell level, the same configuration of the random access occasion is used for the one or more beams corresponding to the cell. Alternatively, the network device may directly perform configuration of a random access occasion in a beam at a beam level. The network device corresponds to one or more beams. The target beam in this embodiment of this application may indicate any one of the one or more beams corresponding to the network device. A level of the configuration of the random access occasion that is performed by the network device is not limited in this embodiment of this application.

In this embodiment of this application, when the network device needs to perform the configuration of the random access occasion for the target beam or the target cell, the network device first obtains the target information. The target information includes the transmission delay difference. It should be noted that the target information in this embodiment of this application may further include other information other than the transmission delay difference. This is not limited in this embodiment of this application.

The transmission delay difference in this embodiment of this application indicates a maximum round trip delay difference corresponding to the target beam or the target cell. The transmission delay difference in this embodiment of this application is the difference between the communication round trip delays respectively corresponding to the first location and the second location in the coverage region of the target beam or the target cell. In this embodiment of this application, the first location is a location corresponding to a reference point in the coverage region of the target beam or the target cell. A communication round trip delay corresponding to the reference point is a minimum communication round trip delay in the coverage region of the target beam or the target cell. In this embodiment of this application, the reference point corresponding to the target beam or the target cell may be a point closest to the network device in the coverage region of the target beam or the target cell on the ground; or the reference point corresponding to the target beam or the target cell may be a geometric center of the coverage region of the target beam or the target cell on the ground. For example, if the coverage region of the target beam or the target cell on the ground is a circular region, the reference point is a center of the circular region. In addition, the reference point may alternatively be at a location that has a specific height from the ground. For example, the reference point has the same latitude and longitude as the point closest to the network device in the coverage region of the target beam or the target cell on the ground, or the geometric center of the coverage region of the target beam or the target cell on the ground. Herein, a vertical distance between the reference point and the ground is 20 kilometers to 30 kilometers. In addition, the reference point may alternatively be located at another location. A specific location of the reference point is not limited in this embodiment of this application. In this embodiment of this application, the second location is a location farthest from the network device in the coverage region of the target beam or the target cell. The communication round trip delay corresponding to the second location is a maximum communication round trip delay in the coverage region of the target beam or the target cell.

202. The network device determines, based on the transmission delay difference in the target information, a first preamble format required for a random access preamble corresponding to the target beam or the target cell.

In this embodiment of this application, after obtaining the target information, the network device determines, based on the transmission delay difference in the target information, the first preamble format required for the random access preamble corresponding to the target beam or the target cell.

Specifically, in this embodiment of this application, a preamble length required for the random access preamble corresponding to the target beam or the target cell is related to the transmission delay difference. For example, when the target transmission delay difference is 1 ms, the preamble length of the random access preamble corresponding to the target beam is at least 3 ms. The greater transmission delay difference indicates the greater length required for the random access preamble. The random access preamble includes a cyclic prefix CP, a Zadoff-chu sequence, and a guard time GT. The random access preamble has a plurality of preamble formats. Random access preambles corresponding to different preamble formats have different lengths of cyclic prefixes CPs, different lengths of Zadoff-chu sequences, and different lengths of guard times GTs. Therefore, the random access preambles corresponding to the different preamble formats have different preamble lengths. The preamble length required for the random access preamble corresponding to the target beam or the target cell may be determined based on the transmission delay difference. Therefore, the network device may determine, based on the transmission delay difference, the first preamble format required for the random access preamble corresponding to the target beam or the target cell. The preamble length corresponding to the first preamble format is greater than or equal to the required preamble length.

It should be noted that, in this embodiment of this application, the first preamble format required for the random access preamble corresponding to the target beam or the target cell may be determined based on the transmission delay difference. In some cases, the first preamble format may further need to be determined with reference to information, for example, an orbit height of the network device and a multi-path delay of channels between the network device and the terminal device in the coverage region of the network device corresponding to the target beam or the target cell. It should be ensured that a length of a CP in the first preamble format of the access preamble is not less than a sum of the transmission delay difference and the multi-path delay.

Optionally, the target information in this embodiment of this application may further include the orbit height of the network device. In this embodiment of this application, the network device may calculate, based on both the transmission delay difference and the orbit height of the network device, the preamble length required for the random access preamble corresponding to the target beam or the target cell, and then determine the first preamble format of the random access preamble corresponding to the target beam or the target cell. It should be noted that the target information in this embodiment of this application may further include other information. The network device may calculate, based on all of the transmission delay difference, the orbit height of the network device, and some other information, the preamble length required for the random access preamble corresponding to the target beam or the target cell, and then determine the first preamble format of the random access preamble corresponding to the target beam or the target cell.

203. The network device determines first configuration information of a random access occasion from one or more types of configuration information based on the first preamble format. The first configuration information is used to indicate the first preamble format and a first set of random access occasions included in a random access period. An interval between random access occasions included in the first set is greater than or equal to the preamble length corresponding to the first preamble format.

In this embodiment of this application, after the network device determines the first preamble format required for the random access preamble corresponding to the target beam or the target cell, the network device determines the first configuration information of the random access occasion from the one or more types of configuration information based on the first preamble format. The first configuration information is used to indicate the first preamble format and the first set of random access occasions included in the random access period. The interval between random access occasions included in the first set is greater than or equal to the preamble length corresponding to the first preamble format. In this embodiment of this application, the random access period indicates a period of random access occasions, for example, may indicate a time period (time interval) of random access occasions that is defined in a standard.

In this embodiment of this application, the first configuration information is one of the one or more types of configuration information. Each type of configuration information is used to indicate a random access preamble format and a set of random access occasions included in a random access period.

204. The network device generates a corresponding first configuration index based on the first configuration information.

In this embodiment of this application, after determining the first configuration information of the random access occasion from the one or more types of configuration information based on the first preamble format, the network device generates the corresponding first configuration index based on the first configuration information.

It may be understood that the first configuration information in this embodiment of this application is one of the one or more types of configuration information. Therefore, the first configuration index corresponding to the first configuration information may also be one of one or more configuration indexes. A one-to-one correspondence exists between the one or more configuration indexes and the one or more types of configuration information.

It should be understood that, in this embodiment of this application, both the network device and the terminal device know the one-to-one correspondence between the one or more configuration indexes and the one or more types of configuration information in advance. In other words, both the network device and the terminal device prestore the one-to-one correspondence between the one or more configuration indexes and the one or more types of configuration information.

Specifically, in this embodiment of this application, the one-to-one correspondence shown in Table 1 may exist between the configuration index and the configuration information.

TABLE 1

Correspondence between a configuration index and configuration information

| | |
|---|---|
| Configuration index 1 | Configuration information 1 |
| Configuration index 2 | Configuration information 2 |
| Configuration index 3 | Configuration information 3 |
| ... | ... |

The correspondence between the configuration index and the configuration information may be learned from Table 1. In an actual application process, after determining the first configuration information of the random access occasion from the one or more types of configuration information based on the first preamble format, the network device generates the corresponding first configuration index based on the first configuration information and the one-to-one correspondence between the configuration index and the configuration information. In this way, after receiving the first configuration index, the terminal device corresponding to the target beam or the target cell can determine, based on the one-to-one correspondence, the first configuration information corresponding to the first configuration index; and can further determine the required random access preamble format and the random access occasion used to transmit the random access preamble.

In this embodiment of this application, the network device can determine, based on the transmission delay difference corresponding to the target beam or the target cell, the first preamble format required for the random access preamble, and determine, based on the required first preamble format, the first configuration information of the random access occasion corresponding to the target beam or the target cell, so that the interval between random access occasions included in the random access period configured for the target beam or the target cell is greater than or equal to the preamble length corresponding to the first preamble format of the random access preamble required for the target beam or the target cell, to resolve a mutual interference problem such as preamble detection window overlapping in a nonterrestrial communication scenario.

Figure 3:
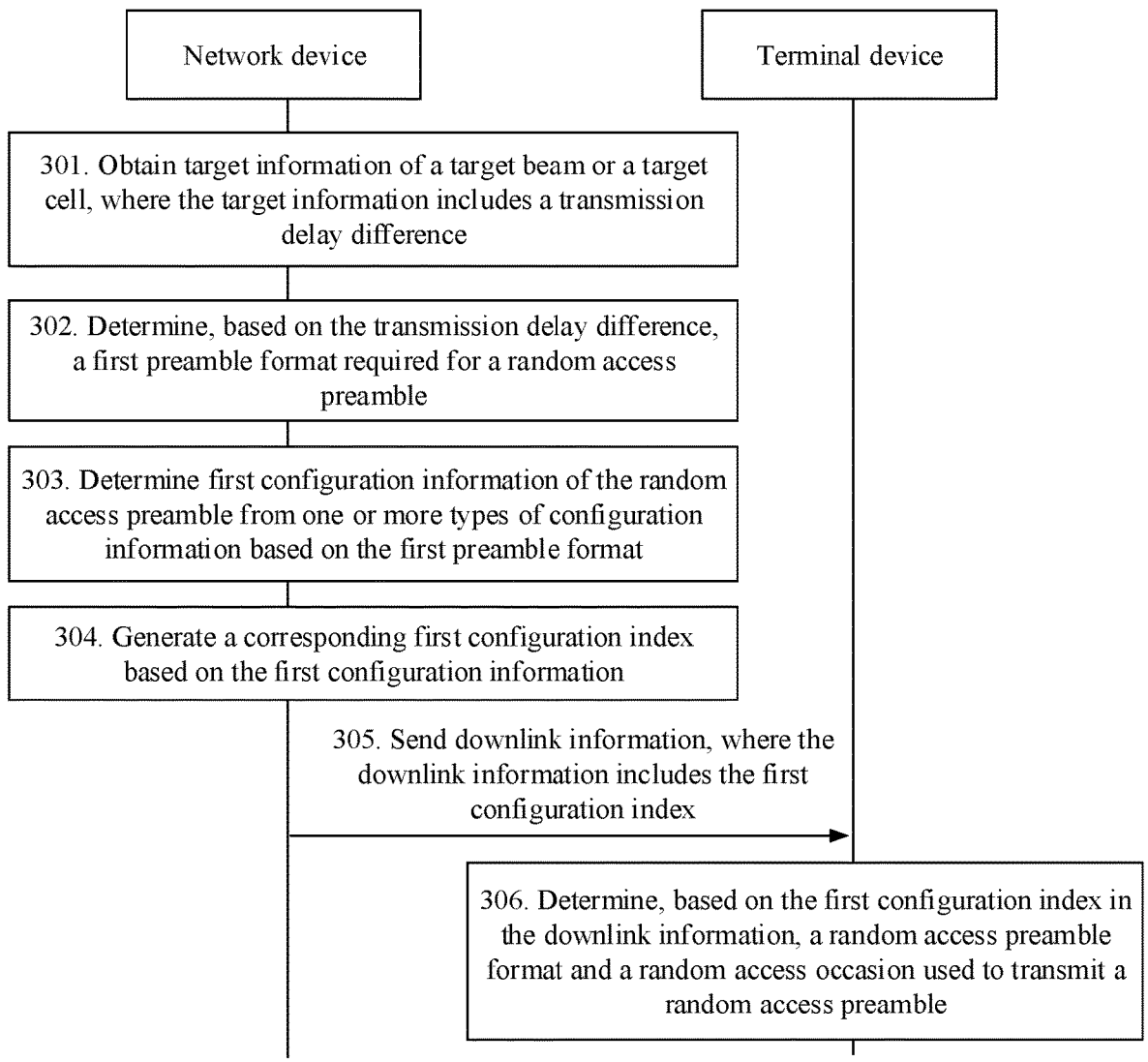
FIG. 3 is a schematic diagram of another embodiment of a data processing method according to an embodiment of this application.

FIG. 3 is a schematic diagram of another embodiment of a data processing method according to an embodiment of this application.

With reference to FIG. 3, the another embodiment of the data processing method provided in the embodiments of this application may include the following steps:

301. A network device obtains target information of a target beam or a target cell. The target information includes a transmission delay difference. The transmission delay difference is a difference between communication round trip delays respectively corresponding to a first location and a second location. The first location is a location corresponding to a reference point in a coverage region of the target beam or the target cell. The second location is a location farthest from the network device in the coverage region of the target beam or the target cell.

For understanding of this embodiment of this application, refer to step 201 in FIG. 2. Details are not described herein again.

302. The network device determines, based on the transmission delay difference, a first preamble format required for a random access preamble corresponding to the target beam or the target cell.

For understanding of this embodiment of this application, refer to step 202 in FIG. 2. Details are not described herein again.

303. The network device determines first configuration information of the random access occasion from one or more types of configuration information based on the first preamble format. The first configuration information is used to indicate the first preamble format and a first set of random access occasions included in a random access period. An interval between random access occasions included in the first set is greater than or equal to the preamble length corresponding to the first preamble format.

For details of this embodiment of this application, refer to related content in step 203 for understanding.

Optionally, in this embodiment of this application, the configuration information includes a target parameter set and a start slot number of a random access occasion, and the target parameter set includes a random access preamble format.

Optionally, the target parameter set further includes one or more of the following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

It should be noted that the target parameter set in this embodiment of this application may further include another type of information other than the foregoing parameters. This is not limited in this embodiment of this application.

Table 2 shows configuration information of a random access occasion.

The configuration information shown in Table 2 includes a random access preamble format, a system frame in which the random access occasion is located, a frame period of the random access occasion, a subframe in which the random access occasion is located, and a start slot number of the random access occasion. Herein, $n_{SFN}$ mod x=y indicates the frame number of the system frame in which the random access occasion is located and the frame period of the random access occasion.

TABLE 2

| Configuration information of a random access occasion | | | | | |
|---|---|---|---|---|---|
| Configuration index | Preamble format | $n_{SFN}$ mod x = y | | Subframe number | Start slot number |
| | | x | y | | |
| Configuration index 1 | Preamble format 1 | 3, 5, 6, 7, or 9 to 15 | 1 or 0 | 0, 4, 8 | 0-7 |
| Configuration index 2 | Preamble format 2 | 3, 5, 6, 7, or 9 to 15 | 1 or 0 | 1, 5, 9 | 0-7 |
| Configuration index 3 | Preamble format 3 | 3, 5, 6, 7, or 9 to 15 | 1 or 0 | 2, 6 | 0-7 |
| Configuration index 4 | Preamble format 4 | 3, 5, 6, 7, or 9 to 15 | 1 or 0 | 0, 2, 3, 5, 6, or 8 | 0-7 |

Specifically, Table 2 also shows some examples of values of configuration parameters included in configuration information corresponding to a configuration index. Based on the values of the configuration parameters shown in Table 2, the random access occasion may be configured on a subframe 0, a subframe 4, and a subframe 8 of a system frame. Alternatively, the random access occasion may be configured on a subframe 1, a subframe 5, and a subframe 9 of a system frame. Alternatively, the random access occasion may be configured on a subframe 2 and a subframe 6 of a system frame. Alternatively, the random access occasion may be configured on a subframe 0, a subframe 2, a subframe 3, a subframe 5, a subframe 6, or a subframe 8 of a system frame. The system frame in which the random access occasion is located may meet $n_{SFN}$ mod x=y, where x is any value in 3, 5, 6, 7, or 9-15, and y is 1 or 0. For example, when x is 3 and y is 1, it indicates that the frame period of the random access occasion is configured as a length of three subframes, that is, 30 ms. The frame number of the system frame is equal to a multiple of 3 plus 1. For example, the frame number of the system frame is 4, 7, 10, or the like. In other words, the random access occasion is located on the system frame whose frame number is 4, 7, 10, or the like. With reference to the foregoing subframe numbers, it indicates that the random access occasion is configured on a subframe 0, a subframe 4, and a subframe 8; on a subframe 1, a subframe 5, and a subframe 9; or on a subframe 2, a subframe 6, and a subframe 10; or on a subframe 0, a subframe 2, a subframe 3, a subframe 5, or a subframe 8 in the system frame whose frame number is 4, 7, 10, or the like.

The configuration information in this embodiment of this application further includes the start slot number of the random access occasion. When subcarrier spacing is 120 kHz, one subframe includes eight slots, and a length of each slot is 0.125 ms. The start slot number may be configured as one or more values in 0 to 7 shown in Table 2. When subcarrier spacing is 60 kHz, one subframe includes four slots, and a length of each slot is 0.25 ms. The start slot number may be configured as one or more values in four values: 0, 1, 2, and 3 in 0 to 7 shown in Table 2. When subcarrier spacing is 30 kHz, one subframe includes two slots, and a length of each slot is 0.5 ms. The start slot number may be configured as one or more values in two values: 0 and 1 in 0 to 7 shown in Table 2. When subcarrier spacing is 15 kHz, one subframe includes one slot, and a length of each slot is 1 ms. The start slot number may be configured as 0 in 0 to 7 shown in Table 2. An example in which subcarrier spacing is 120 kHz is used for description. When the start slot number is configured as 0, it indicates that a slot 0 in a subframe in which a random access occasion is located is a start slot of the random access occasion, and the subframe has only one random access occasion. When the start slot number is configured as 0 and 4, it indicates that a slot 0 and a slot 4 in a subframe in which random access occasions are located are start slots of the random access occasions, the subframe has two random access occasions, and an interval between the two random access occasions is 0.5 ms.

In this embodiment of this application, the network device configures the system frame in which the random access occasion is located, the subframe in which the random access occasion is located, and the start slot of the random access occasion, so that the interval between random access occasions in the random access period is greater than or equal to the preamble length corresponding to the first preamble format required for the random access preamble corresponding to the target beam or the target cell.

For example, it is assumed that the network device determines that the preamble length of the first preamble format required for the random access preamble corresponding to the target beam or the target cell is 0.5 ms. The network device determines the first configuration information based on the first preamble format. The interval that is between random access occasions included in the random access period and that is indicated by the first configuration information is equal to the preamble length corresponding to the first preamble format, that is, 0.5 ms. The configuration parameter included in the first configuration information may use a value shown in Table 3.

As shown in Table 3, the random access occasion may be configured on a subframe 0, a subframe 4, and a subframe 8 of a system frame. Alternatively, the random access occasion may be configured on a subframe 1, a subframe 5, and a subframe 9 of a system frame. Alternatively, the random access occasion may be configured on a subframe 2 and a subframe 6 of a system frame. Alternatively, the random access occasion may be configured on a subframe 0, a subframe 2, a subframe 3, a subframe 5, a subframe 6, or a subframe 8 of a system frame. The system frame in which the random access occasion is located may meet $n_{SRN}$ mod x=y, where x is any value in 3, 5, 6, 7, or 9-15, and y is 1 or 0. In other words, the frame period of the random access occasion may be 30 ms, 50 ms, 60 ms, 70 ms, 90 ms, 100 ms, 110 ms, 120 ms, 130 ms, 140 ms, or 150 ms. When subcarrier spacing is 120 kHz, one subframe includes eight slots, and a length of each slot is 0.125 ms. The start slot number of the random access occasion may be configured as 0 and 4. An interval between two random access occasions included in the subframe in which the random access occasion is located is 0.5 ms. When subcarrier spacing is 60 kHz, one subframe includes four slots, and a length of each slot is 0.5 ms. The start slot number may be configured as 0 and 2. An interval between two random access occasions included in the subframe in which the random access occasion is located is 0.5 ms. When subcarrier spacing is 30 kHz, one subframe includes two slots, and a length of each slot is 0.25 ms. The start slot number may be configured as 0 and 1. An interval between two random access occasions included in the subframe in which the random access occasion is located is 0.5 ms. When subcarrier spacing is 15 kHz, one subframe includes only one slot, and a length of each slot is 1 ms. The quantity of random access occasions in the subframe or the slot in which the random access occasion is located may be configured as 2, so that an interval between two random access occasions included in the subframe in which the random access occasion is located is 0.5 ms.

It should be noted that the value of the configuration parameter in Table 3 is merely an example, and the configuration parameter may alternatively be another value. This is not limited in this embodiment of this application.

TABLE 3

Four configuration manners corresponding to different subcarrier spacing

| Subcarrier spacing | Configuration index | Preamble format | $n_{SFN}$ mod x = y | | Subframe number | Start slot number | Quantity of random access occasions in a subframe or a slot in which a random access occasion is located |
| --- | --- | --- | --- | --- | --- | --- | --- |
| | | | x | y | | | |
| 15 kHz | Target configuration index | Preamble format 1 | 3, 5, 6, 7, or 9 to 15 | 1 or 0 | 0, 4, 8 | 0 | 2 |
| 30 kHz | Target configuration index | Preamble format 1 | 3, 5, 6, 7, or 9 to 15 | 1 or 0 | 1, 5, 9 | 0, 1 | 2 |
| 60 kHz | Target configuration index | Preamble format 1 | 3, 5, 6, 7, or 9 to 15 | 1 or 0 | 2, 6 | 0, 2 | 2 |
| 120 kHz | Target configuration index | Preamble format 1 | 3, 5, 6, 7, or 9 to 15 | 1 or 0 | 0, 2, 3, 5, 6, or 8 | 0, 4 | 2 |

304. The network device generates a corresponding first configuration index based on the first configuration information.

For understanding of this embodiment of this application, refer to step 204 in FIG. 2. Details are not described herein again.

305. The network device sends downlink information to the target beam or the target cell. The downlink information includes the first configuration index.

In this embodiment of this application, after generating the corresponding first configuration index based on the first configuration information, the network device sends the downlink information to the target beam or the target cell. The downlink information includes the first configuration index.

Optionally, in this embodiment of this application, the first configuration index may be a physical random access channel PRACH configuration index, the PRACH configuration index includes n bits, m bits in the n bits are used to indicate the start slot number of the random access occasion, n is greater than m, and m is an integer greater than or equal to 1.

Specifically, in this embodiment of this application, the first configuration index is one of one or more types of configuration indexes. The configuration index may be a physical random access channel PRACH configuration index (PRACH configuration index). A size of the configuration index may correspond to one or more types of configuration information. For example, if the plurality of types of configuration information are less than or equal to $2^n$ pieces of configuration information, the size of the configuration index may be n bits. This is not limited in this embodiment of this application. For example, n=8. When the size of the configuration index is eight bits, it may correspond to a plurality of types (for example, less than or equal to 256) of configuration information. The m bits in the n bits are used to indicate the start slot number of the random access occasion. The value of m may correspond to a quantity of start slot numbers. For example, when the subcarrier spacing is 120 kHz, one subframe includes eight slots corresponding to eight slot numbers: 0 to 7. Therefore, three bits are needed to indicate the start slot numbers, that is, m=3. Herein, (n−m) bits in the n bits are used to indicate a quantity of values (for example, less than or equal to $2^{n-m}$) corresponding to the target parameter set.

Optionally, in this embodiment of this application, the first configuration index includes a first index and a second index, the first index is used to indicate the target parameter set, and the second index is used to indicate the start slot number of the random access occasion.

Specifically, in this embodiment of this application, the first configuration index is one of one or more types of configuration indexes. The configuration index may include the first index and the second index. The first index is used to indicate the target parameter set. The second index is used to indicate the start slot number of the random access occasion. In this embodiment of this application, the network device may indicate the second index by using four bits indicating a high-layer parameter of cyclic shift signaling. In this embodiment of this application, the network device may also indicate the second index by adding bits to high-layer signaling (for example, a SIB 1), and send the signaling. This is not limited in this embodiment of this application.

306. The terminal device determines, based on the downlink information, a random access preamble format and a random access occasion used to transmit a random access preamble.

In this embodiment of this application, the terminal device is located in the coverage region of the target beam or the target cell. After receiving the downlink information sent by the network device to the target beam or the target cell, the terminal device determines, based on the downlink information, the random access preamble format and the random access occasion used to transmit the random access preamble.

Specifically, after receiving the downlink information, the terminal device determines the first configuration information based on the first configuration index in the downlink information; then, determines, based on the first preamble format and the first set that are indicated by the first configuration information, that the random preamble format is the first preamble format; and determines, from the first set, the random access occasion used to transmit the random access preamble.

In this embodiment of this application, the network device can determine, based on the transmission delay difference corresponding to the target beam or the target cell, the first preamble format required for the random access preamble, and determine, based on the required first preamble format, the first configuration information of the random access occasion corresponding to the target beam or the target cell, so that the interval between random access occasions included in the random access period configured for the target beam or the target cell is greater than or equal to the preamble length corresponding to the first preamble format of the random access preamble required for the target beam or the target cell. Therefore, the interval between random access occasions at which the terminal device corresponding to the target beam or the target cell sends the random access preamble is greater than or equal to the preamble length corresponding to the first preamble format, to avoid a mutual interference problem such as preamble detection window overlapping in a non-terrestrial communication scenario.

Figure 4A:
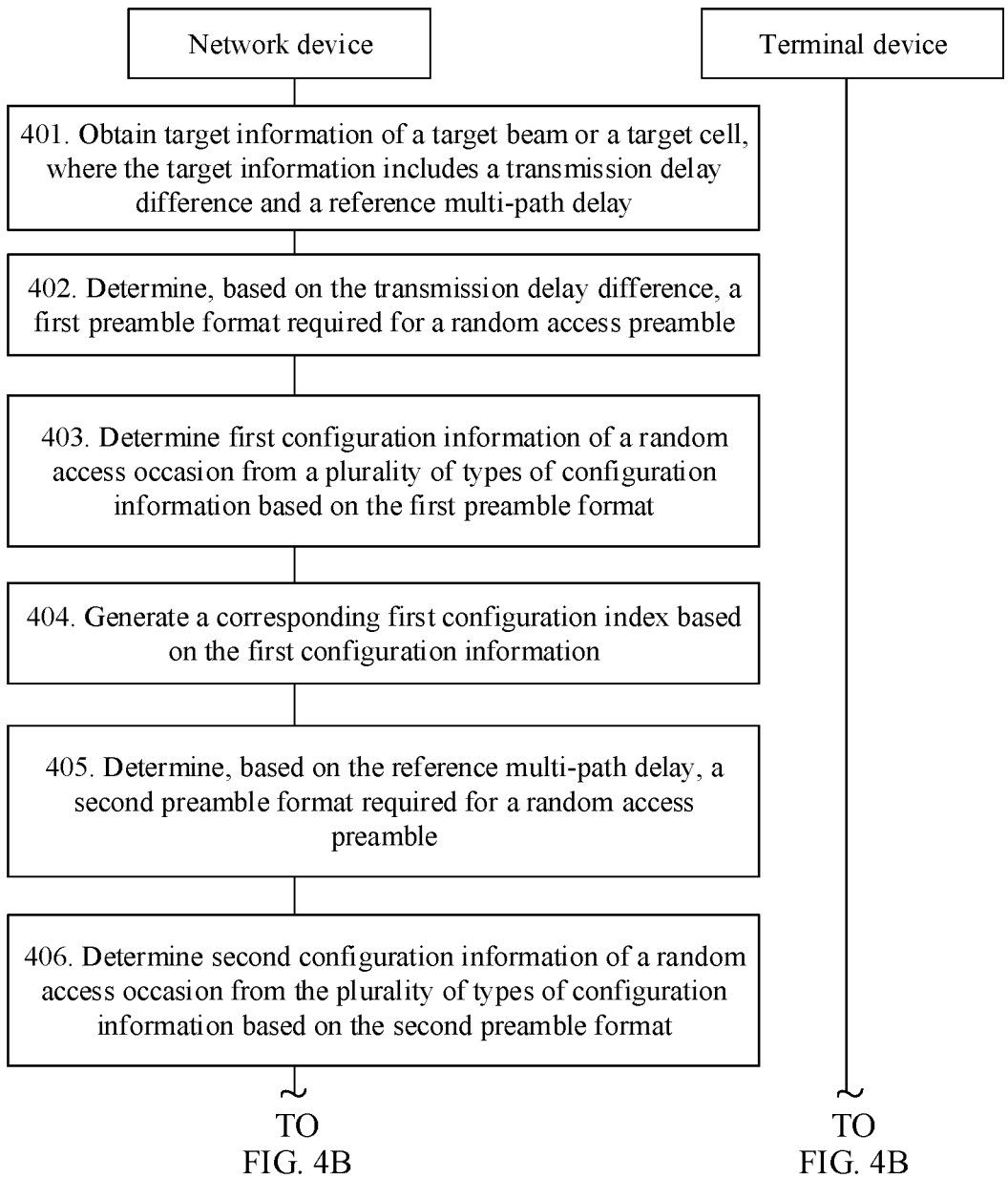
FIG. 4A and FIG. 4B are a schematic diagram of another embodiment of a data processing method according to an embodiment of this application.
Figure 4B:
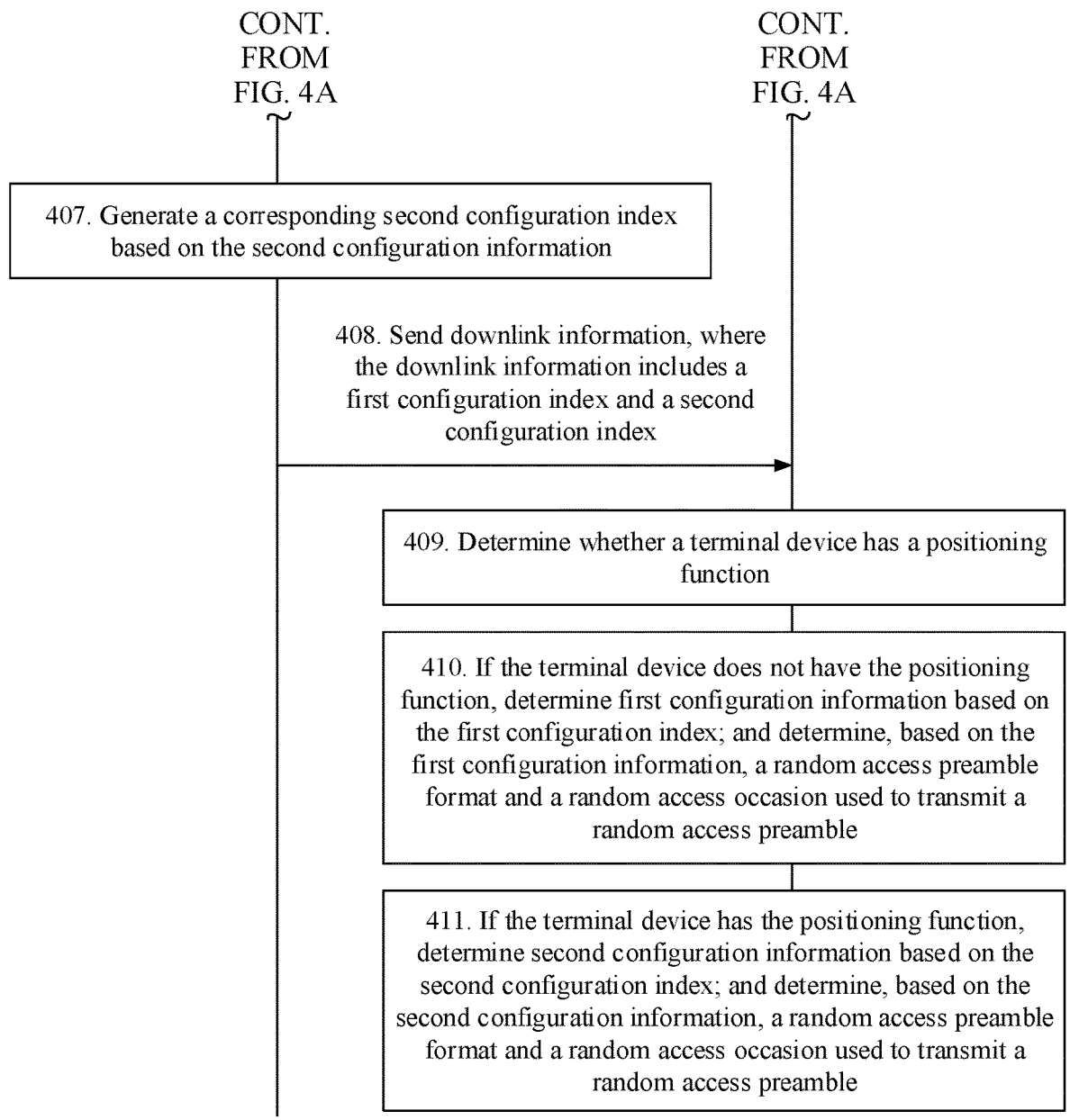

FIG. 4A and FIG. 4B are a schematic diagram of another embodiment of a data processing method according to an embodiment of this application.

With reference to FIG. 4A and FIG. 4B, the another embodiment of the data processing method provided in the embodiments of this application includes the following steps:

401. A network device obtains target information of a target beam or a target cell. The target information includes a transmission delay difference and a reference multi-path delay. The transmission delay difference is a difference between communication round trip delays respectively corresponding to a first location and a second location. The first location is a location corresponding to a reference point in a coverage region of the target beam or the target cell. The second location is a location farthest from the network device in the coverage region of the target beam or the target cell.

For content related to the transmission delay difference in this embodiment of this application, refer to step 301 in FIG. 3. Details are not described herein again.

In this embodiment of this application, the target information further includes the reference multi-path delay.

The target beam or the target cell may include a terminal device without a positioning function, or may include a terminal device with a positioning function. The terminal device with the positioning function may determine location information of the terminal device by using the positioning function. In addition, the terminal device can obtain a location of a base station such as a satellite, to calculate a timing advance required by the terminal device to send a signal, to reduce a timing error that is caused due to a round trip delay or a round trip delay difference and that requires compensation by using a CP in a preamble. In other words, a preamble format required for the terminal device with the positioning function corresponds to a shorter preamble length. In an ideal case, the transmission delay difference corresponding to the target beam or the target cell may be not considered for the preamble format of the random access preamble required for the terminal device with the positioning function. However, the terminal device with the positioning function still needs to consider an impact from delay spread caused due to a multi-path effect to a decoded signal of a receive end. The impact caused due to the multi-path delay needs to be compensated through compensation of the CP. In a communication process, the signal transmitted by the network device at the transmit end may arrive at the terminal device at the receive end by using a direct path, or may arrive at the terminal device at the receive end through reflection and diffraction by using an indirect path. A quantity of signal reflection times depends on factors such as a signal incident angle, a carrier frequency, and polarization of an incident wave. Because the direct path and various indirect reflection paths have different lengths, signal components arrive at the terminal device at a receive end through different paths at different times, thereby generating the multi-path delay. The multi-path delay may indicate a difference between a minimum time and a maximum time in which the signal components arrive at the receive end through different paths.

The reference multi-path delay in this embodiment of this application may indicate a maximum multi-path delay in multi-path delays corresponding to different locations in the coverage region of the target beam or the target cell. In an actual application process, the reference multi-path delay may not need to be measured in real time, and an empirical value of the maximum multi-path delay may be directly used. For example, a length of a preamble CP is fixed in a terrestrial communication process, and the fixed length of the CP is determined based on a maximum value of a multi-path delay that is of a communication channel in a city and that is obtained through channel measurement.

Optionally, in this embodiment of this application, an orbit height of the network device may cause a specific path loss. A magnitude of the path loss also affects a preamble length. A greater path loss indicates a longer preamble length. Therefore, the target information in this embodiment of this application may further include the orbit height of the network device.

402. The network device determines, based on the transmission delay difference, a first preamble format required for a random access preamble corresponding to the target beam or the target cell.

For understanding of this embodiment of this application, refer to step 302 in FIG. 3. Details are not described herein again.

403. The network device determines first configuration information of a random access occasion from a plurality of types of configuration information based on the first preamble format. The first configuration information is used to indicate the first preamble format and a first set of random access occasions included in a random access period. An interval between random access occasions included in the first set is greater than or equal to the preamble length corresponding to the first preamble format.

For understanding of this embodiment of this application, refer to step 303 in FIG. 3. Details are not described herein again.

It should be noted that there are the plurality of types of configuration information in this embodiment of this application, and the first configuration information is one of the plurality of types of configuration information.

404. The network device generates a corresponding first configuration index based on the first configuration information.

For understanding of this embodiment of this application, refer to step 204 in FIG. 2. Details are not described herein again.

405. The network device determines, based on the reference multi-path delay, a second preamble format required for a random access preamble corresponding to the target beam or the target cell.

In this embodiment of this application, after obtaining the target information, the network device determines, based on the reference multi-path delay in the target information, the second preamble format required for the random access preamble corresponding to the target beam or the target cell. It needs to be ensured that a CP length in the second preamble format is not less than a length of the reference multi-path delay.

It should be noted that, in this embodiment of this application, the second preamble format of the random access preamble required for the target beam or the target cell may be obtained not only based on the reference multi-path delay. In some cases, the second preamble format may further need to be determined with reference to information such as the orbit height of the network device.

Optionally, the target information in this embodiment of this application may further include the orbit height of the network device. In this embodiment of this application, the network device may calculate, based on both the reference multi-path delay and the orbit height of the network device, a second preamble length required for the random access preamble corresponding to the target beam or the target cell.

406. The network device determines second configuration information of a random access occasion from the plurality of types of configuration information based on the second preamble format. The second configuration information is used to indicate the second preamble format and a second set of random access occasions included in a random access period. An interval between random access occasions included in the second set is greater than or equal to the preamble length corresponding to the second preamble format.

In this embodiment of this application, after the network device determines the second preamble format required for the random access preamble corresponding to the target beam or the target cell, the network device determines the second configuration information of the random access occasion from the plurality of types of configuration information based on the second preamble format. The second configuration information is used to indicate the second preamble format and the second set of random access occasions included in the random access period. The interval between random access occasions included in the second set is greater than or equal to the preamble length corresponding to the second preamble format. In this embodiment of this application, the second configuration information is one of the plurality of types of configuration information. Each type of configuration information is used to indicate a random access preamble format and a set of random access occasions included in a random access period.

It should be noted that the first configuration information and the second configuration information in this embodiment of this application are two different types of configuration information in the plurality of types of configuration.

407. The network device generates a corresponding second configuration index based on the second configuration information.

In this embodiment of this application, after determining the second configuration information of the random access occasion from the plurality of types of configuration information based on the second preamble format, the network device generates the corresponding second configuration index based on the second configuration information.

It may be understood that, in this embodiment of this application, the first configuration information and the second configuration information are two different types of configuration information in the plurality of types of configuration information. Therefore, the second configuration index corresponding to the second configuration information and the first configuration index corresponding to the first configuration information are also two different configuration indexes in a plurality of configuration indexes.

It should be noted that a sequence of step 402 to step 404, and step 405 to step 407 is not specifically limited in this embodiment of this application.

408. The network device sends downlink information to the target beam or the target cell. The downlink information includes the first configuration index and the second configuration index.

In this embodiment of this application, after separately generating the first configuration index and the second configuration index, the network device sends the downlink information to the target beam or the target cell. The downlink information includes the first configuration index and the second configuration index.

For content related to the configuration index in this embodiment of this application, refer to step 305 in FIG. 3. Details are not described herein again.

409. The terminal device receives the downlink information, and determines whether the terminal device has a positioning function.

In this embodiment of this application, after receiving the downlink information including the first configuration index and the second configuration index, the terminal device first determines whether the terminal device has the positioning function.

410. If the terminal device does not have the positioning function, the terminal device determines the first configuration information based on the first configuration index; and determines, based on the first configuration information, the random access preamble format and the random access occasion used to transmit the random access preamble.

In this embodiment of this application, if the terminal device determines that the terminal device does not have the positioning function, the terminal device determines the first configuration information based on the first configuration index; then, determines, based on the first preamble format and the first set that are indicated by the first configuration information, that the random preamble format is the first preamble format; and determines, from the first set, the random access occasion used to transmit the random access preamble.

411. If the terminal device has the positioning function, the terminal device determines the second configuration information based on the second configuration index; and determines, based on the second configuration information, the random access preamble format and the random access occasion used to transmit the random access preamble.

In this embodiment of this application, if the terminal device determines that the terminal device has the positioning function, the terminal device determines the second configuration information based on the second configuration index; then, determines, based on the second preamble format and the second set that are indicated by the second configuration information, that the random preamble format is the second preamble format; and determines, from the second set, the random access occasion used to transmit the random access preamble. In this embodiment of this application, the network device respectively determines, based on the transmission delay difference and a reference multi-path signal corresponding to the target beam or the target cell, the first preamble format and the second preamble format required for the random access preambles; and determines, based on the required first preamble format and the required second preamble format, the two types of configuration information of the random access occasions corresponding to the target beam or the target cell. The interval that is between random access occasions and that is indicated by each of the two types of configuration information is greater than or equal to the preamble length corresponding to the corresponding preamble format. The two types of configuration information are separately used by the terminal device with the positioning function and the terminal device without the positioning function in the target beam or the target cell to determine the random access preamble format and the random access occasion used to transmit the random access preamble. In this way, a mutual interference problem such as preamble detection window overlapping in a non-terrestrial communication scenario can be avoided. In addition, configuration of a random access occasion can be implemented for different terminal devices, to save time-frequency resources occupied by the random access preamble.

The foregoing describes the data processing method provided in the embodiments of this application. The following describes the data processing apparatus provided in the embodiments of this application.

Figure 5:
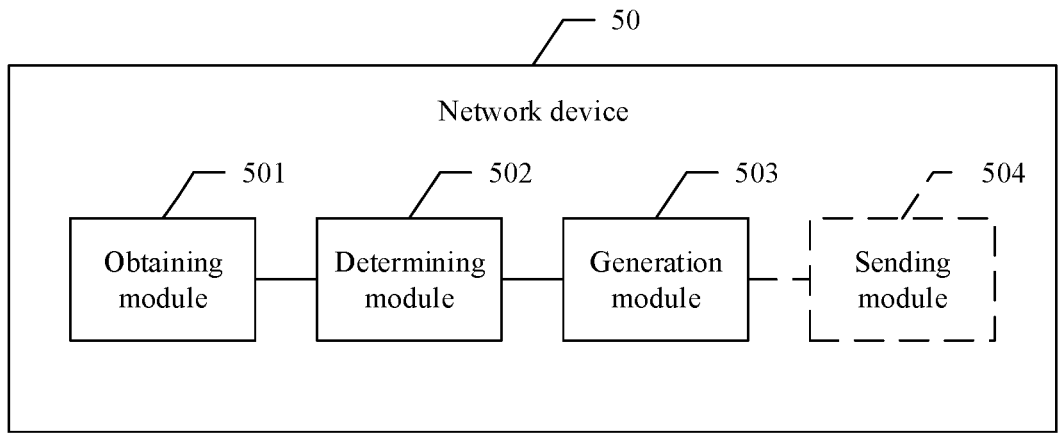
FIG. 5 is a schematic diagram of a structure of a network device according to an embodiment of this application.

FIG. 5 is a schematic diagram of a structure of a network device 50 according to an embodiment of this application.

With reference to FIG. 5, a network device 50 provided in an embodiment of this application may include an obtaining module 501, a determining module 502, and a generation module 503.

The obtaining module 501 is configured to obtain target information of a target beam or a target cell. The target information includes a transmission delay difference. The transmission delay difference is a difference between communication round trip delays respectively corresponding to a first location and a second location. The first location is a location corresponding to a reference point in a coverage region of the target beam or the target cell. The second location is a location farthest from the network device in the coverage region of the target beam or the target cell.

The determining module 502 is configured to determine, based on the transmission delay difference included in the target information obtained by the obtaining module 501, a first preamble format required for a random access preamble corresponding to the target beam or the target cell.

The determining module 502 is further configured to determine first configuration information of a random access occasion from one or more types of configuration information based on the first preamble format. The first configuration information is used to indicate the first preamble format and a first set of random access occasions included in a random access period. An interval between random access occasions included in the first set is greater than or equal to a preamble length corresponding to the first preamble format.

The generation module 503 is configured to generate a corresponding first configuration index based on the first configuration information determined by the determining module 502.

Optionally, in an embodiment, the network device 50 further includes a sending module 504, configured to send downlink information to the target beam or the target cell. The downlink information includes the first configuration index generated by the generation module. The downlink information is used by a terminal device in a target region or the target cell to determine, based on the first configuration information corresponding to the first configuration index, a random access preamble format and a random access occasion used to transmit a random access preamble.

Optionally, in an embodiment, the target information further includes a reference multi-path delay corresponding to the target beam or the target cell. The determining module 502 is further configured to: determine, based on the reference multi-path delay in the target information obtained by the obtaining module 501, a second preamble format required for a random access preamble corresponding to the target beam or the target cell; and determine second configuration information of a random access occasion from the one or more types of configuration information based on the second preamble format. The second configuration information is used to indicate the second preamble format and a second set of random access occasions included in a random access period. An interval between random access occasions included in the second set is greater than or equal to a preamble length corresponding to the second preamble format. The generation module 503 is further configured to generate a corresponding second configuration index based on the second configuration information determined by the determining module.

Optionally, in an embodiment, the sending module 504 is further configured to send downlink information to the target beam or the target cell. The downlink information includes the first configuration index and the second configuration index that are determined by the determining module. The downlink information is used to: after a terminal device in a target region determines that the terminal device does not have a positioning function, determine, based on the first configuration information corresponding to the first configuration index, a random access preamble format and a random access occasion used to transmit a random access preamble; or when a terminal device determines that the terminal device has a positioning function, determine, based on the second configuration information corresponding to the second configuration index, a random access preamble format and a random access occasion used to transmit a random access preamble.

Optionally, in an embodiment, the configuration information includes a target parameter set and a start slot number of a random access occasion, and the target parameter set includes a random access preamble format.

Optionally, in an embodiment, the target parameter set further includes one or more of the following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

Optionally, in an embodiment, the first configuration index or the second configuration index is a physical random access channel PRACH configuration index, the PRACH configuration index includes n bits, m bits in the n bits are used to indicate the start slot number of the random access occasion, n is greater than m, and m is an integer greater than or equal to 1.

Optionally, in an embodiment, the first configuration index or the second configuration index includes a first index and a second index, the first index is used to indicate the target parameter set, and the second index is used to indicate a start slot number of the random access occasion.

It should be understood that in this embodiment of this application, the obtaining module 501, the determining module 502, and the generation module 503 may be implemented by a processor or a processor-related circuit component, and the sending module 504 may be implemented by a transceiver or a transceiver-related circuit component.

Figure 6:
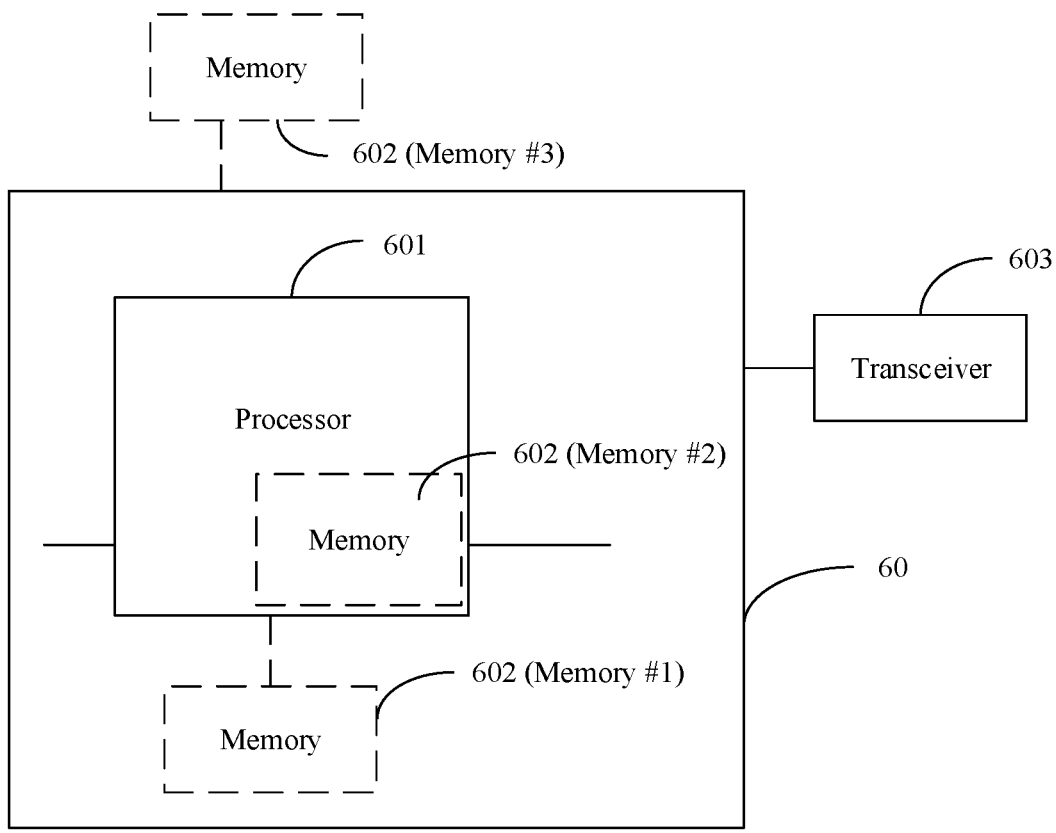
FIG. 6 shows an embodiment of a network device according to an embodiment of this application.

As shown in FIG. 6, an embodiment of this application further provides a network device 60. The network device 60 includes a processor 601 and a memory 602. The memory 602 may be independent of the processor or independent of the network device (Memory #3), or may be in the processor or the network device (Memory #1 and Memory #2). The memory 602 may be a physically independent unit, or may be storage space, a network hard disk, or the like on a cloud server.

The memory 602 is configured to store computer-readable instructions (or referred to as a computer program).

The processor 601 is configured to read the computer-readable instructions to implement the method provided in any one of the foregoing aspects related to the network device and the implementations thereof. Specifically, the processor 601 is configured to perform the operations performed by the obtaining module 501, the determining module 502, and the generation module 503 in the foregoing embodiment.

Optionally, the memory 602 (Memory #1) is located in the apparatus.

Optionally, the memory 602 (Memory #2) is integrated with the processor.

Optionally, the memory 602 (Memory #3) is located outside the apparatus.

Optionally, the network device 60 further includes a transceiver 603, configured to receive and send data. Specifically, the transceiver 603 is configured to perform the operation performed by the sending module 504 in the foregoing embodiment.

It should be understood that, the network device 50 or the network device 60 according to the embodiments of this application may correspond to the network device in the data processing method according to the embodiments of this application, and the operations and/or the functions of the modules in the network device 50 or the network device 60 are intended to implement corresponding procedures of the methods in FIG. 2 to FIG. 4A and FIG. 4B. For brevity, details are not described herein again.

Figure 7:
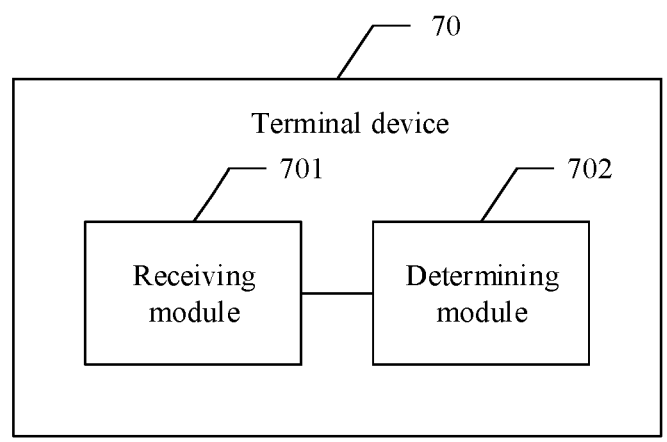
FIG. 7 is a schematic diagram of a structure of a terminal device according to an embodiment of this application.

FIG. 7 is a schematic diagram of a structure of a terminal device 70 according to an embodiment of this application.

With reference to FIG. 7, the another terminal device 70 provided in an embodiment of this application may include a receiving module 701 and a determining module 702.

The receiving module 701 is configured to receive downlink information sent by a network device. The downlink information includes a first configuration index. First configuration information corresponding to the first configuration index is determined by the network device from one or more types of configuration information based on a first preamble format required for a random access preamble corresponding to a target beam or a target cell. The first configuration information is used to indicate the first preamble format and a first set of random access occasions included in a random access period. An interval between random access occasions included in the first set is greater than or equal to a preamble length corresponding to the first preamble format. The first preamble format is determined by the network device based on a transmission delay difference included in obtained target information. The transmission delay difference is a difference between communication round trip delays respectively corresponding to a first location and a second location. The first location is a location corresponding to a reference point in a coverage region of the target beam. The second location is a location farthest from the network device in the coverage region of the target beam.

The determining module 702 is configured to determine, based on the downlink information received by the receiving module 701, a random access preamble format and a random access occasion used to transmit a random access preamble.

Optionally, in an embodiment, the determining module 702 is configured to: determine the first configuration information based on the first configuration index in the downlink information; and determine, based on the first configuration information, the random access preamble format and the random access occasion used to transmit the random access preamble.

Optionally, in an embodiment, the downlink information further includes a second configuration index. Second configuration information corresponding to the second configuration index is determined by the network device from the one or more types of configuration information based on a second preamble format required for a random access preamble corresponding to the target beam or the target cell. The second configuration information is used to indicate the second preamble format and a second set of random access occasions included in a random access period. An interval between random access occasions included in the second set is greater than or equal to a preamble length corresponding to the second preamble format. The determining module 702 is configured to: determine whether the device has a positioning function; and if the device does not have the positioning function, determine the first configuration information based on the first configuration index, and determine, based on the first configuration information, the random access preamble format and the random access occasion used to transmit the random access preamble; or if the device has the positioning function, determine the second configuration information based on the second configuration index, and determine, based on the second configuration information, the random access preamble format and the random access occasion used to transmit the random access preamble.

Optionally, in an embodiment, the configuration information includes a target parameter set and a start slot number of a random access occasion, and the target parameter set includes a random access preamble format.

Optionally, in an embodiment, the target parameter set further includes one or more of the following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

Optionally, in an embodiment, the first configuration index or the second configuration index is a physical random access channel PRACH configuration index, the PRACH configuration index includes n bits, m bits in the n bits are used to indicate the start slot number of the random access occasion, n is greater than m, and m is an integer greater than or equal to 1.

Optionally, in an embodiment, the first configuration index or the second configuration index includes a first index and a second index, the first index is used to indicate the target parameter set, and the second index is used to indicate a start slot number of the random access occasion.

It should be understood that, in this embodiment of this application, the determining module 702 may be implemented by a processor or a processor-related circuit component, and the receiving module 701 may be implemented by a transceiver or a transceiver-related circuit component.

Figure 8:
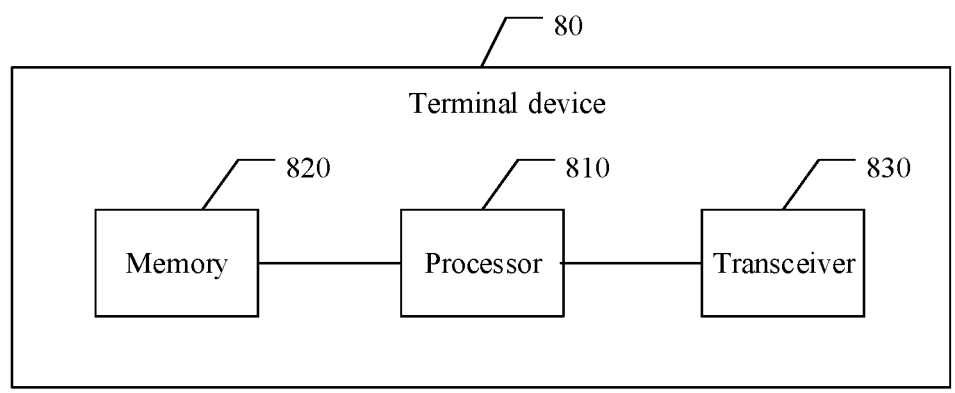
FIG. 8 shows an embodiment of a terminal device according to an embodiment of this application.

As shown in FIG. 8, an embodiment of this application further provides a terminal device 80. The terminal device 80 includes a processor 810, a memory 820, and a transceiver 830. The memory 820 stores instructions or a program, and the processor 810 is configured to execute the instructions or the program stored in the memory 820. When the instructions or the program stored in the memory 820 are/is executed, the processor 810 is configured to perform an operation performed by the determining module 702 in the foregoing embodiment, and the transceiver 830 is configured to perform an operation performed by the receiving module 701 in the foregoing embodiment.

It should be understood that, the terminal device 70 or the terminal device 80 according to the embodiments of this application may correspond to the terminal device in the data processing method according to the embodiments of this application, and the operations and/or the functions of the modules in the terminal device 70 or the terminal device 80 are intended to implement corresponding procedures of the methods in FIG. 2 to FIG. 4A and FIG. 4B. For brevity, details are not described herein again.

Figure 9:
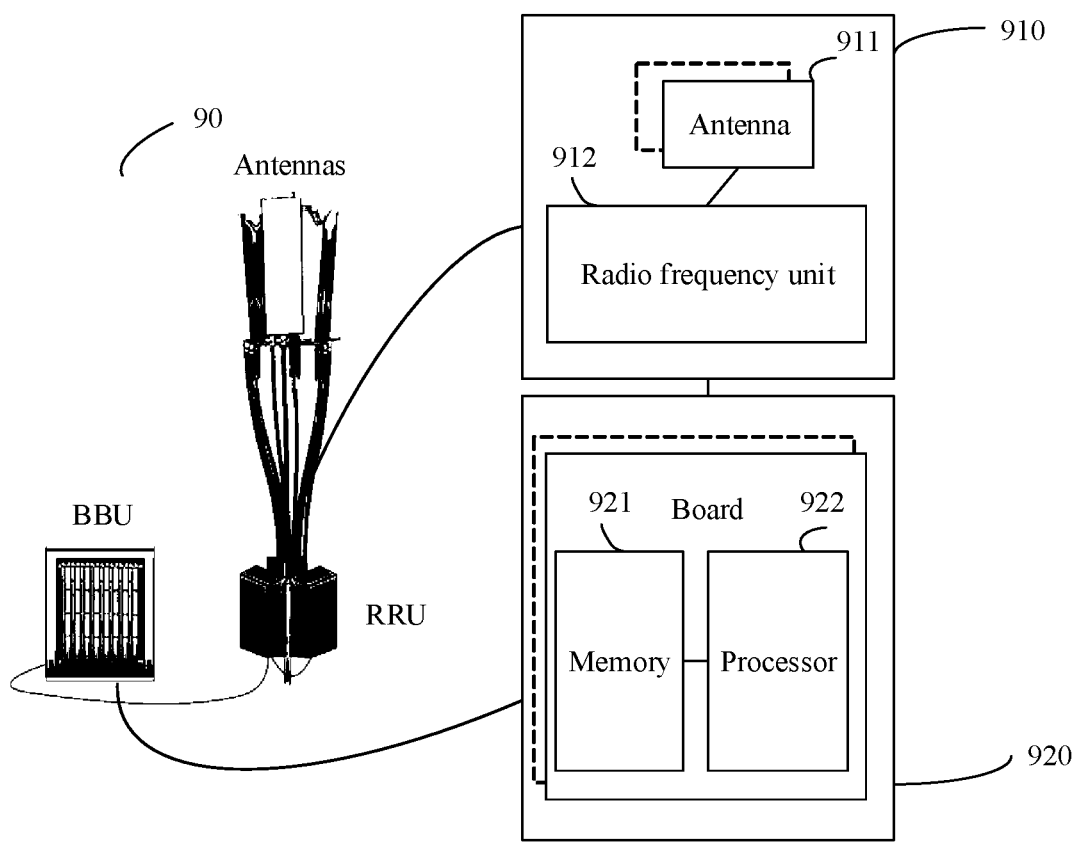
FIG. 9 shows another embodiment of a network device according to an embodiment of this application.

The network device in the embodiments of this application may be shown in FIG. 9, and the network device 90 includes one or more radio frequency units, such as a remote radio unit (RRU) 910, and one or more baseband units (BBUs) (which may also be referred to as digital units (DUs)) 920. The RRU 910 may be referred to as a transceiver module, and corresponds to the sending module 504 in FIG. 5. Optionally, the transceiver module may also be referred to as a transceiver machine, a transceiver circuit, a transceiver, or the like, and may include at least one antenna 911 and a radio frequency unit 912. The RRU 910 is mainly configured to: send and receive a radio frequency signal, and perform conversion between the radio frequency signal and a baseband signal. For example, the RRU 910 is configured to send indication information to a terminal device. The BBU 920 is mainly configured to perform baseband processing, control the base station, and the like. The RRU 910 and the BBU 920 may be physically disposed together, or may be physically separated, that is, in a distributed base station.

The BBU 920 is a control center of the base station, and is mainly configured to implement a baseband processing function, for example, channel coding, multiplexing, modulation, and spreading. For example, the BBU may be configured to control the base station to perform an operation procedure related to the network device in the foregoing method embodiments, for example, to generate the foregoing downlink information.

In an example, the BBU 920 may include one or more boards, and a plurality of boards may jointly support a radio access network (for example, an LTE network) having a single access standard, or may separately support radio access networks (for example, an LTE network, a 5G network, or another network) having different access standards. The BBU 920 further includes a memory 921 and a processor 922. The memory 921 is configured to store necessary instructions and data. The processor 922 is configured to control the base station to perform necessary actions, for example, configured to control the base station to perform an operation procedure related to the network device in the foregoing method embodiments. The memory 921 and the processor 922 may serve one or more boards. In other words, a memory and a processor may be independently disposed on each board. Alternatively, the plurality of boards may share the same memory and the same processor. In addition, each board may further be provided with a necessary circuit.

Figure 10:
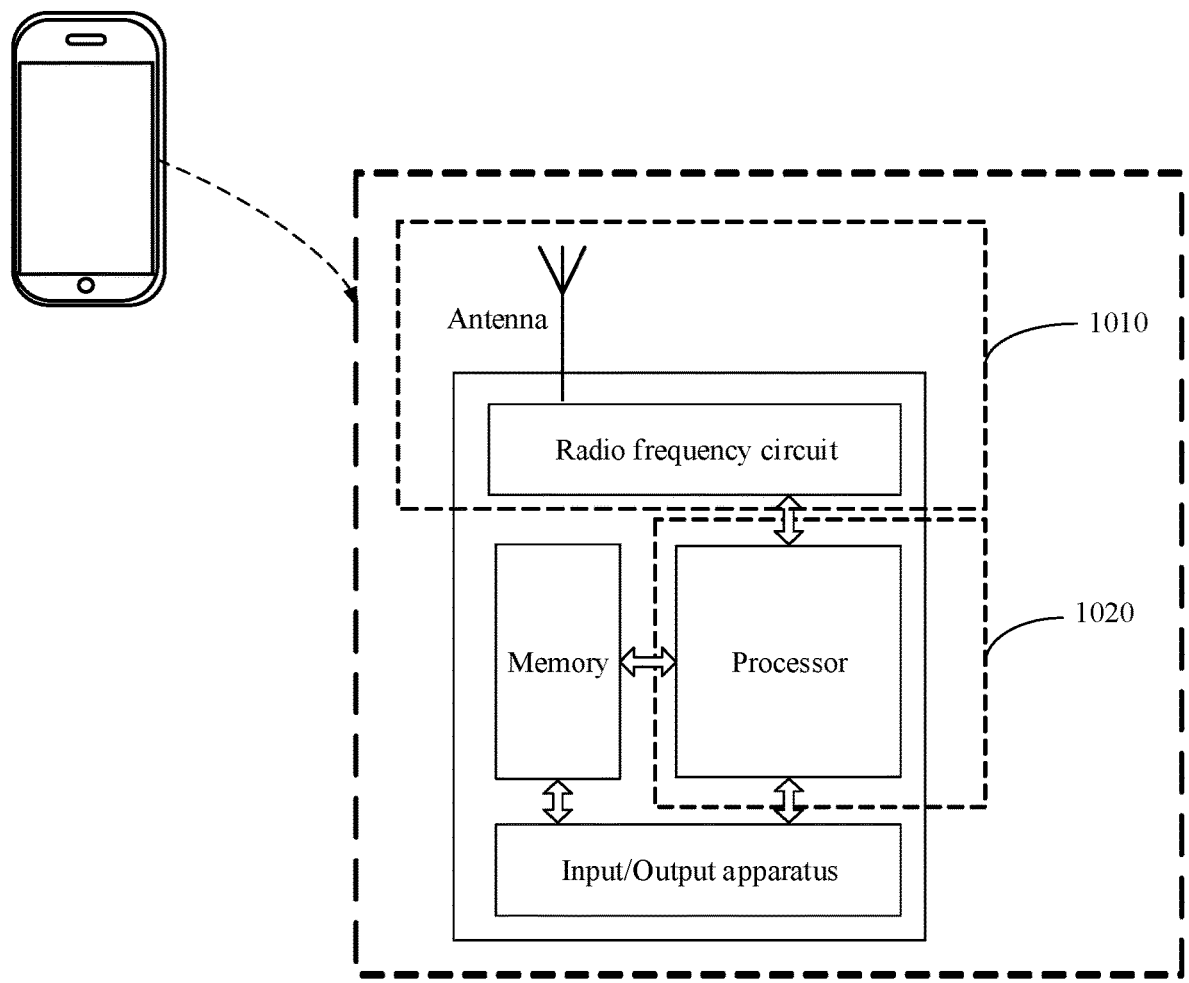
FIG. 10 shows another embodiment of a terminal device according to an embodiment of this application.

FIG. 10 is a simplified schematic diagram of a structure of a terminal device. For ease of understanding and illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to transmit and receive a radio frequency signal in an electromagnetic wave form. The input/output apparatus, such as a touchscreen, a display screen, or a keyboard, is mainly configured to: receive data entered by a user, and output data to the user. It should be noted that some types of terminal devices may not have the input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the terminal device, and the processor that has a processing function may be considered as a processing unit of the terminal device. As shown in FIG. 10, the terminal device includes a transceiver unit 1010 and a processing unit 1020. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 1010 may be considered as a receiving unit, and a component for implementing a sending function in the transceiver unit 1010 may be considered as a sending unit. In other words, the transceiver unit 1010 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

Optionally, an embodiment of this application provides a chip system. The chip system includes a processor, configured to support a network device in implementing the foregoing data processing method. In a possible design, the chip system further includes a memory. The memory is configured to store program instructions and data that are necessary for the network device. The chip system may include a chip, or may include a chip and another discrete component. This is not specifically limited in this embodiment of this application.

Optionally, an embodiment of this application provides a chip system. The chip system includes a processor, configured to support a terminal device in implementing the foregoing data processing method. In a possible design, the chip system further includes a memory. The memory is configured to store program instructions and data that are necessary for the terminal device. The chip system may include a chip, or may include a chip and another discrete component. This is not specifically limited in this embodiment of this application.

It should be understood that, the processor mentioned in the embodiments of this application may be a central processing unit (CPU), and may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined by functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented all or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the steps of the methods in the embodiments may be implemented by a program instructing related hardware. The program may be stored in a computer-readable storage medium. The storage medium may include a ROM, a RAM, a magnetic disk, or an optical disc, or the like.

The foregoing describes in detail the data processing method, the apparatus, and the storage medium that are provided in the embodiments of this application. Principles and implementations of this application are described in this specification by using specific examples. The descriptions of the foregoing embodiments are merely provided to help understand the method and core ideas of this application. In addition, a person of ordinary skill in the art can make variations and modifications to this application in terms of the specific implementations and application scopes based on the ideas of this application. Therefore, the content of this specification shall not be construed as a limit to this application.

What is claimed is:

1. A data processing method, comprising:
   obtaining, by a network device, target information of a target beam or a target cell, wherein the target information comprises a transmission delay difference and a reference multi-path delay corresponding to the target beam or the target cell, the transmission delay difference is a difference between communication round trip delays corresponding to a first location and a second location, the first location is a location corresponding to a reference point in a coverage region of the target beam or the target cell, and the second location is a location farthest from the network device in the coverage region of the target beam or the target cell;

determining, by the network device based on the transmission delay difference in the target information, a first preamble format required for a random access preamble corresponding to the target beam or the target cell;

determining, by the network device based on the reference multi-path delay, a second preamble format required for a random access preamble corresponding to the target beam or the target cell;

determining, by the network device, first configuration information of a random access occasion from one or more types of configuration information based on the first preamble format, wherein the first configuration information indicates the first preamble format and a first set of random access occasions comprised in a random access period, and wherein an interval between random access occasions comprised in the first set of random access occasions is greater than or equal to a preamble length corresponding to the first preamble format; and generating, by the network device, a first configuration index based on the first configuration information.

2. The method according to claim 1, wherein the method further comprises:
after generating the first configuration index based on the first configuration information, sending, by the network device, downlink information to a terminal device in the coverage region of the target beam or the target cell, wherein the downlink information comprises the first configuration index, and the first configuration index is used by the terminal device in the coverage region of the target beam or the target cell to determine a random access preamble format and a random access occasion used to transmit a random access preamble.

3. The method according to claim 1, wherein the method further comprises:
determining, by the network device, second configuration information of a random access occasion from the one or more types of configuration information based on the second preamble format, wherein the second configuration information indicates the second preamble format and a second set of random access occasions comprised in a random access period, and wherein an interval between random access occasions comprised in the second set of random access occasions is greater than or equal to a preamble length corresponding to the second preamble format; and generating, by the network device, a second configuration index based on the second configuration information.

4. The method according to claim 3, wherein the method further comprises:
after generating the second configuration index based on the second configuration information, sending, by the network device, downlink information to the target beam or the target cell, wherein the downlink information comprises the first configuration index and the second configuration index, wherein the first configuration index determines a random access preamble format and a random access occasion used by a terminal device that does not have a positioning function to transmit a random access preamble, and wherein the second configuration index determines a random access preamble format and a random access occasion used by a terminal device that has a positioning function to transmit a random access preamble.

5. The method according to claim 3, wherein:
the first configuration index or the second configuration index is a physical random access channel (PRACH) configuration index, the PRACH configuration index comprises n bits, m bits in the n bits are used to indicate a start slot number of the random access occasion, n is greater than m, and m is an integer greater than or equal to 1; or
the first configuration index or the second configuration index comprises a first index and a second index, wherein the first index indicates a target parameter set and the second index indicates a start slot number of the random access occasion.

6. The method according to claim 1, wherein configuration information comprises a target parameter set and a start slot number of a random access occasion, and the target parameter set comprises a random access preamble format.

7. The method according to claim 6, wherein the target parameter set further comprises one or more of following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

8. A data processing method, comprising:
receiving, by a terminal device, downlink information sent by a network device, wherein the downlink information comprises a first configuration index and a second configuration index, and the first configuration index corresponds to a first configuration information, wherein the first configuration information is determined from one or more types of configuration information based on a first preamble format required for a random access preamble corresponding to a target beam or a target cell, the second configuration index corresponds to a second configuration information, wherein the second configuration information is determined from the one or more types of configuration information based on a second preamble format required for a random access preamble corresponding to the target beam or the target cell, and the first configuration information indicates the first preamble format and a first set of random access occasions comprised in a random access period, wherein an interval between random access occasions comprised in the first set of random access occasions is greater than or equal to a preamble length corresponding to the first preamble format, the first preamble format is determined based on a transmission delay difference comprised in an obtained target information, and wherein the transmission delay difference is a difference between communication round trip delays corresponding to a first location and a second location, the second preamble format is determined based on a reference multi-path delay comprised in the obtained target information, the first location is a location corresponding to a reference point in a coverage region of the target beam or the target cell, and the second location is a location farthest from the network device in the coverage region of the target beam or the target cell; and determining, by the terminal device based on the downlink information, a random access preamble format and a random access occasion used to transmit a random access preamble.

9. The method according to claim 8, wherein the determining, by the terminal device based on the downlink information, a random access preamble format and a random access occasion used to transmit a random access preamble comprises:

determining, by the terminal device, the first configuration information based on the first configuration index in the downlink information; and determining, by the terminal device based on the first configuration information, the random access preamble format and the random access occasion used to transmit the random access preamble.

10. The method according to claim 8, wherein wherein the second configuration information indicates the second preamble format and a second set of random access occasions comprised in a random access period, wherein an interval between random access occasions comprised in the second set of random access occasions is greater than or equal to a preamble length corresponding to the second preamble format, and the determining, by the terminal device based on the downlink information, a random access preamble format and a random access occasion used to transmit a random access preamble comprises:

determining, by the terminal device, whether the terminal device has a positioning function, wherein the determining whether the terminal device has a position function further comprises:

in response to determining that the terminal device does not have the positioning function, determining, by the terminal device, the first configuration information based on the first configuration index, and determining, by the terminal device based on the first configuration information, the random access preamble format and the random access occasion used to transmit the random access preamble; or in response to determining that the terminal device has the positioning function, determining, by the terminal device, the second configuration information based on the second configuration index, and determining, by the terminal device based on the second configuration information, the random access preamble format and the random access occasion used to transmit the random access preamble.

11. The method according to claim 10, wherein:

the first configuration index or the second configuration index is a physical random access channel (PRACH) configuration index, the PRACH configuration index comprises n bits, m bits in the n bits are used to indicate a start slot number of the random access occasion, n is greater than m, and m is an integer greater than or equal to 1; or, the first configuration index or the second configuration index comprises a first index and a second index, wherein the first index indicates a target parameter set, and the second index indicates the start slot number of the random access occasion.

12. The method according to claim 8, wherein configuration information comprises a target parameter set and a start slot number of a random access occasion, and the target parameter set comprises a random access preamble format.

13. The method according to claim 12, wherein the target parameter set further comprises one or more of following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

14. A terminal device, comprising:
at least one processor;
one or more memories coupled to the at least one processor, the one or more memories comprising programming instructions that, when executed by the at least one processor, cause the terminal device to:

receive downlink information sent by a network device, wherein the downlink information comprises a first configuration index and a second configuration index, and the first configuration index corresponds to a first configuration information, wherein the first configuration information is determined from one or more types of configuration information based on a first preamble format required for a random access preamble corresponding to a target beam or a target cell, the second configuration index corresponds to a second configuration information, wherein the second configuration information is determined from the one or more types of configuration information based on a second preamble format required for a random access preamble corresponding to the target beam or the target cell, and the first configuration information indicates the first preamble format and a first set of random access occasions comprised in a random access period, wherein an interval between random access occasions comprised in the first set of random access occasions is greater than or equal to a preamble length corresponding to the first preamble format, the first preamble format is determined based on a transmission delay difference comprised in an obtained target information, and wherein the transmission delay difference is a difference between communication round trip delays corresponding to a first location and a second location, the second preamble format is determined based on a reference multi-path delay comprised in the obtained target information, the first location is a location corresponding to a reference point in a coverage region of the target beam or the target cell, and the second location is a location farthest from the network device in the coverage region of the target beam or the target cell; and determine, based on the downlink information, a random access preamble format and a random access occasion used to transmit a random access preamble.

15. The terminal device according to claim 14, wherein the programming instructions, when executed by the at least one processor, cause the terminal device to:

determine, the first configuration information based on the first configuration index in the downlink information; and determine, based on the first configuration information, the random access preamble format and the random access occasion used to transmit the random access preamble.

16. The terminal device according to claim 14, wherein wherein the second configuration information indicates the second preamble format and a second set of random access occasions comprised in a random access period, wherein an interval between random access occasions comprised in the second set of random access occasions is greater than or equal to a preamble length corresponding to the second preamble format, and the programming instructions, when executed by the at least one processor, cause the terminal device to:
- determine whether the terminal device has a positioning function, wherein determine whether the terminal device has a position function further comprises:
- in response to determining that the terminal device does not have the positioning function, determining the first configuration information based on the first configuration index, and
- determining based on the first configuration information, the random access preamble format and the random access occasion used to transmit the random access preamble; or
- in response to determining that the terminal device has the positioning function, determining the second configuration information based on the second configuration index, and
- determining, based on the second configuration information, the random access preamble format and the random access occasion used to transmit the random access preamble.

17. The terminal device according to claim 16, wherein:
the first configuration index or the second configuration index is a physical random access channel (PRACH) configuration index, the PRACH configuration index comprises n bits, m bits in the n bits are used to indicate a start slot number of the random access occasion, n is greater than m, and m is an integer greater than or equal to 1; or,
the first configuration index or the second configuration index comprises a first index and a second index, wherein the first index indicates a target parameter set, and the second index indicates the start slot number of the random access occasion.

18. The terminal device according to claim 14, wherein configuration information comprises a target parameter set and a start slot number of a random access occasion, and the target parameter set comprises a random access preamble format.

19. The terminal device according to claim 18, wherein the target parameter set further comprises one or more of following parameters: a system frame in which a random access occasion is located, a subframe in which a random access occasion is located, a location of a start OFDM symbol of a random access occasion, a quantity of random access occasions in a subframe or a slot in which a random access occasion is located, or duration of a random access occasion in a subframe or a slot in which a random access occasion is located.

* * * * *